US011695604B2

(12) United States Patent
Luo et al.

(10) Patent No.: US 11,695,604 B2
(45) Date of Patent: Jul. 4, 2023

(54) ENHANCEMENTS FOR PROVIDED GUARD SIGNALS IN IAB NETWORK

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Karl Georg Hampel, Hoboken, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/166,811

(22) Filed: Feb. 3, 2021

(65) Prior Publication Data

US 2021/0273836 A1    Sep. 2, 2021

Related U.S. Application Data

(60) Provisional application No. 62/983,384, filed on Feb. 28, 2020.

(51) Int. Cl.
*H04L 27/26* (2006.01)
*H04W 68/00* (2009.01)
(Continued)

(52) U.S. Cl.
CPC ....... *H04L 27/2607* (2013.01); *H04W 68/005* (2013.01); *H04W 76/27* (2018.02); *H04W 80/02* (2013.01); *H04W 88/14* (2013.01)

(58) Field of Classification Search
CPC ... H04L 27/2607; H04L 45/20; H04L 5/0091; H04L 5/0073; H04L 27/2601;
(Continued)

(56) References Cited

U.S. PATENT DOCUMENTS

2020/0382250 A1    12/2020    Choi et al.
2021/0144705 A1*    5/2021    Li ..................... H04W 28/0215
(Continued)

FOREIGN PATENT DOCUMENTS

WO        2020/202190        10/2020

OTHER PUBLICATIONS

ZTE, Sanechips, TP for Guard Symbol MAC CE, 3GPP TSG-RAN WG2 Meeting #109 electronic, Elbonia, Feb. 24-Mar. 6, 2020, R2-2001645 (Year: 2020).*

(Continued)

*Primary Examiner* — Shailendra Kumar
(74) *Attorney, Agent, or Firm* — Arent Fox, LLP

(57) ABSTRACT

An integrated access and backhaul (IAB) node may receive a parent knowledge message, the parent knowledge message indicating whether a parent IAB node of the child IAB node has received an optional signaling message, determining to transition between first resources and second resources at a transition time, the first resources being associated with use of a mobile termination of the child IAB node, the second resources being associated with use of the distributed unit of the child IAB node, and determine a number of guard symbols provided by the parent IAB node at the transition time based on whether the parent knowledge message indicates that the parent IAB node has received the optional signaling message.

29 Claims, 29 Drawing Sheets

(51) Int. Cl.
*H04W 76/27* (2018.01)
*H04W 80/02* (2009.01)
*H04W 88/14* (2009.01)

(58) Field of Classification Search
CPC ... H04W 68/005; H04W 76/27; H04W 80/02; H04W 88/14; H04W 16/10; H04W 88/085; H04B 7/15542
See application file for complete search history.

(56) References Cited

U.S. PATENT DOCUMENTS

| | | | |
|---|---|---|---|
| 2022/0141074 | A1 | 5/2022 | You et al. |
| 2022/0182977 | A1* | 6/2022 | Miao ................. H04L 5/0053 |
| 2022/0279511 | A1* | 9/2022 | Kowalski .......... H04W 72/0406 |

OTHER PUBLICATIONS

International Search Report and Written Opinion—PCT/US2021/016978—ISA/EPO—dated Jun. 23, 2021.

Partial International Search Report—PCT/US2021/016978—ISA/EPO—dated Apr. 26, 2021.

Qualcomm Incorporated: "Clarifications on IAB Resource Management", 3GPP TSG-RAN WG1 Meeting #100e, 3GPP Draft; R1-2000961, 3rd Generation Partnership Project (3GPP), Mobile Competence Centre; 650, Route De Lucioles; F-06921 Sophia-Antipolis Cedex; France, vol. RAN WG1, No. Feb. 24, 2020-Mar. 3, 2020, Feb. 15, 2020 (Feb. 15, 2020), 11 Pages, XP051853536, Retrieved from the Internet: URL: https://ftp.3gpp.org/tsg_ran/WG1_RL1/TSGR1_100_e/Docs/R1-2000961.zip R1-2000961—Clarifications on IAB resource management.docx [retrieved on Feb. 15, 2020], Section "Clarifications on mechanism for guard symbols request and grant".

ZTE., et al., "TP for Guard Symbol MAC CE", 3GPP TSG-RAN WG2 Meeting #109 electronic, 3GPP Draft R2-2001645, 3rd Generation Partnership Project (3GPP), Mobile Competence Centre; 650, Route De Lucioles; F-06921 Sophia-Antipolis Cedex; France, vol. RAN W2, No. Elbonia; Feb. 24, 2020-Mar. 6, 2020, Feb. 14, 2020 (Feb. 14, 2020), 5 Pages, XP051849936, Retrieved from the Internet: URL: https://ftp.3gpp.org/tsg_ran/WG2_RL2/TSGR2_109_e/Docs/R2-200164.zip R2-2001645 TP for Guard Symbol MAC CE_v2.doc [retrieved on Feb. 14, 2020], Section 2.

* cited by examiner

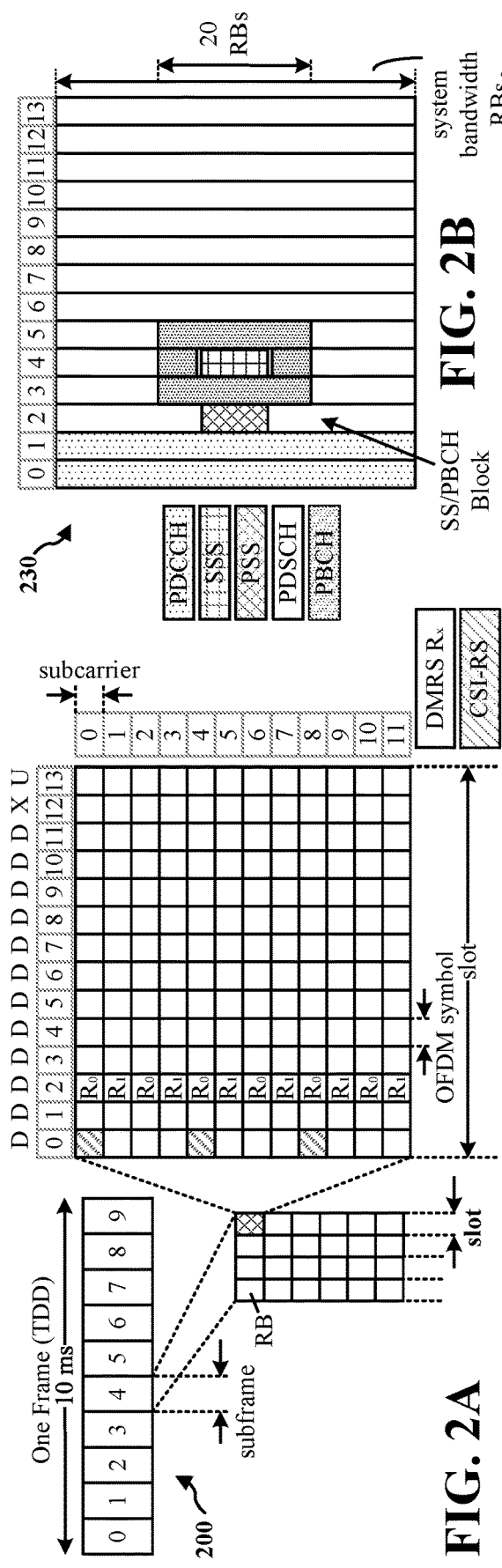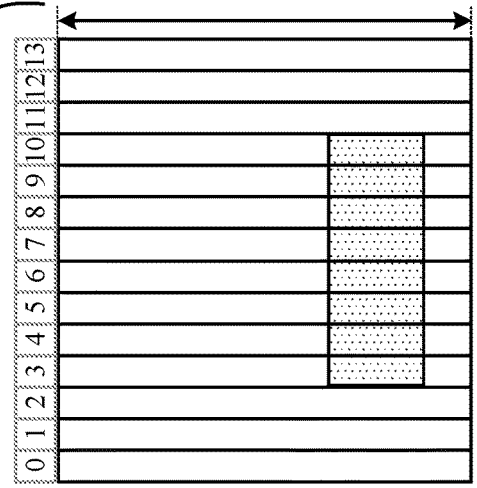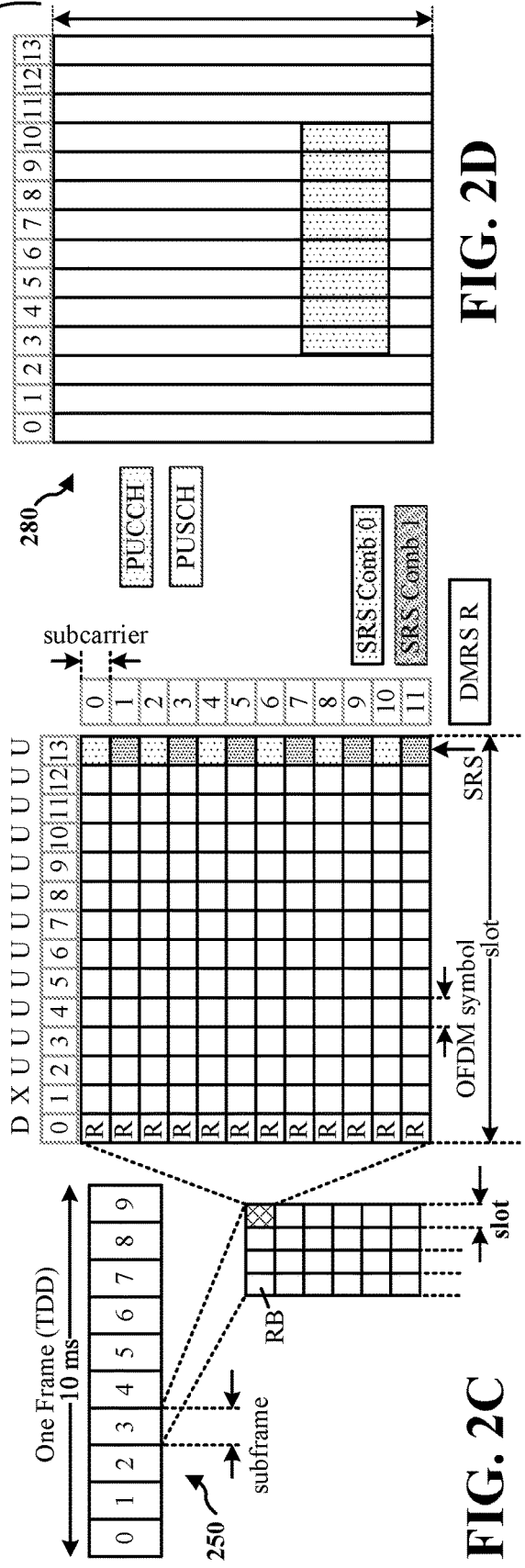

MT to DU TRANSITIONS

| Before (MT) \ After (DU) | DL Tx | UL Rx |
|---|---|---|
| DL Rx | Type 1 | Type 2 |
| UL Tx | Type 3 | Type 4 |

DU to MT TRANSITIONS

| Before (DU) \ After (MT) | DL Rx | UL Tx |
|---|---|---|
| DL Tx | Type 5 | Type 6 |
| UL Rx | Type 7 | Type 8 |

ENHANCEMENTS FOR PROVIDED GUARD SIGNALS IN IAB NETWORK

CROSS REFERENCE TO RELATED APPLICATION(S)

This application claims the benefit of U.S. Provisional Application Ser. No. 62/983,384, entitled "ENHANCEMENTS FOR PROVIDED GUARD SIGNALS IN IAB NETWORK" and filed on Feb. 28, 2020, which is expressly incorporated by reference herein in its entirety.

BACKGROUND

Technical Field

The present disclosure relates generally to communication systems, and more particularly, to an integrated access and backhaul (IAB) network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an integrated access and backhaul (IAB) node. The apparatus may receive a parent knowledge message, the parent knowledge message indicating whether a parent IAB node of the child IAB node has received an optional signaling message; determine to transition between first resources and second resources at a transition time, the first resources being associated with use of a mobile termination of the child IAB node, the second resources being associated with use of the distributed unit of the child IAB node; and determine a number of guard symbols provided by the parent IAB node at the transition time based on whether the parent knowledge message indicates that the parent IAB node has received the optional signaling message.

In another aspect of the disclosure, a method, a computer-readable medium, and an apparatus are provided. The apparatus may be an IAB node. The apparatus may receive an optional signaling message from a central unit of an IAB donor; transmit, to a child IAB node, a parent knowledge message indicating that the parent IAB node has received the optional signaling message; and provide a number of guard symbols at a transition time of the child IAB node, the number of guard symbols being based on the optional signaling message.

In another aspect of the disclosure, a method, a computer-readable medium, and an apparatus are provided. The apparatus may be an IAB donor. The apparatus may transmit an optional signaling message to a parent IAB node; and transmit a parent knowledge message to the child IAB node of the parent IAB node, the parent knowledge message indicating whether the parent IAB node received the optional signaling message.

In another aspect of the disclosure, a method, a computer-readable medium, and an apparatus are provided. The apparatus may be an IAB donor. The apparatus may transmit a first configuration message to a first set of IAB nodes of an IAB network, the first configuration message configuring the first set of IAB nodes to provide guard symbols at transition instances of the child IAB nodes of the first set of IAB nodes; and transmit a second configuration message to a second set of IAB nodes of the IAB network, the second configuration message configuring the second set of IAB nodes to not provide guard symbols at transition instances of the child IAB nodes of the second set of IAB nodes.

In another aspect of the disclosure, a method, a computer-readable medium, and an apparatus are provided. The apparatus may be an IAB node. The apparatus may receive, from an IAB donor, a configuration message, the configuration message directing the parent IAB node whether to provide guard symbols or to not provide guard symbols to a child IAB node of the parent IAB node; determine a transition instance for a child IAB node of the parent IAB node, the transition instance being a transition between use of a mobile terminal of the child IAB node and use of a distributed unit of the child IAB node; provide guard symbols at the transition instance if the configuration message directed the parent IAB node to provide guard symbols; and provide no guard symbols at the transition instance if the configuration message directed the parent IAB node not to provide guard symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 8 is a table illustrating IAB node transition types.

DETAILED DESCRIPTION

Figure 1:
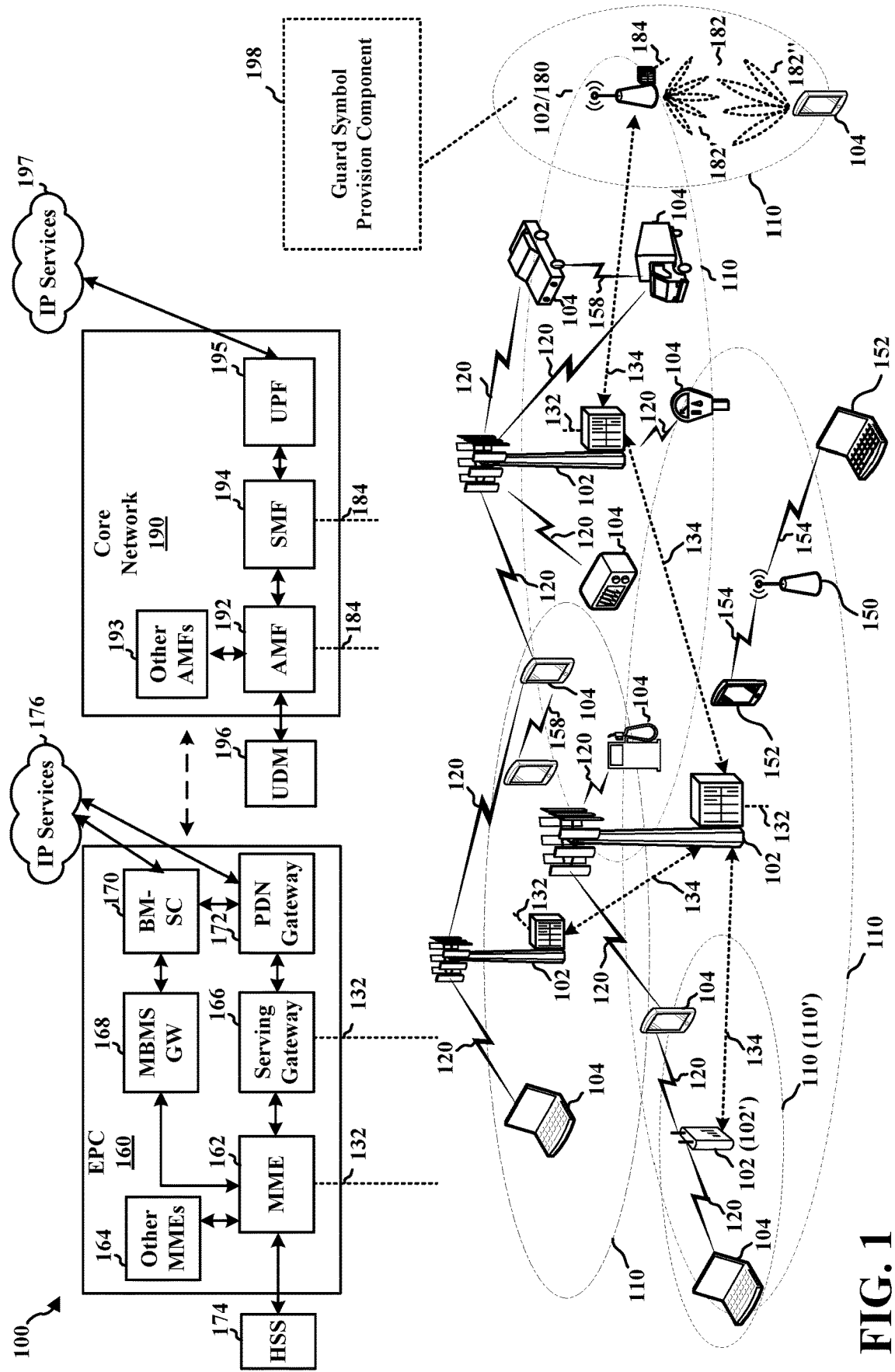
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be a part of an integrated access and backhaul (IAB) network (e.g., may be or may include an IAB node or an IAB donor), such as an IAB node or an IAB donor. The base station 180 may include a guard symbol provision component 198. The guard symbol provision component 198 may be configured to determine whether resources are associated with the use of a mobile termination (MT) of an IAB node or with the use of a distributed unit (DU) of the IAB node, and may determine to provide guard symbols to the IAB node based on the determination. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
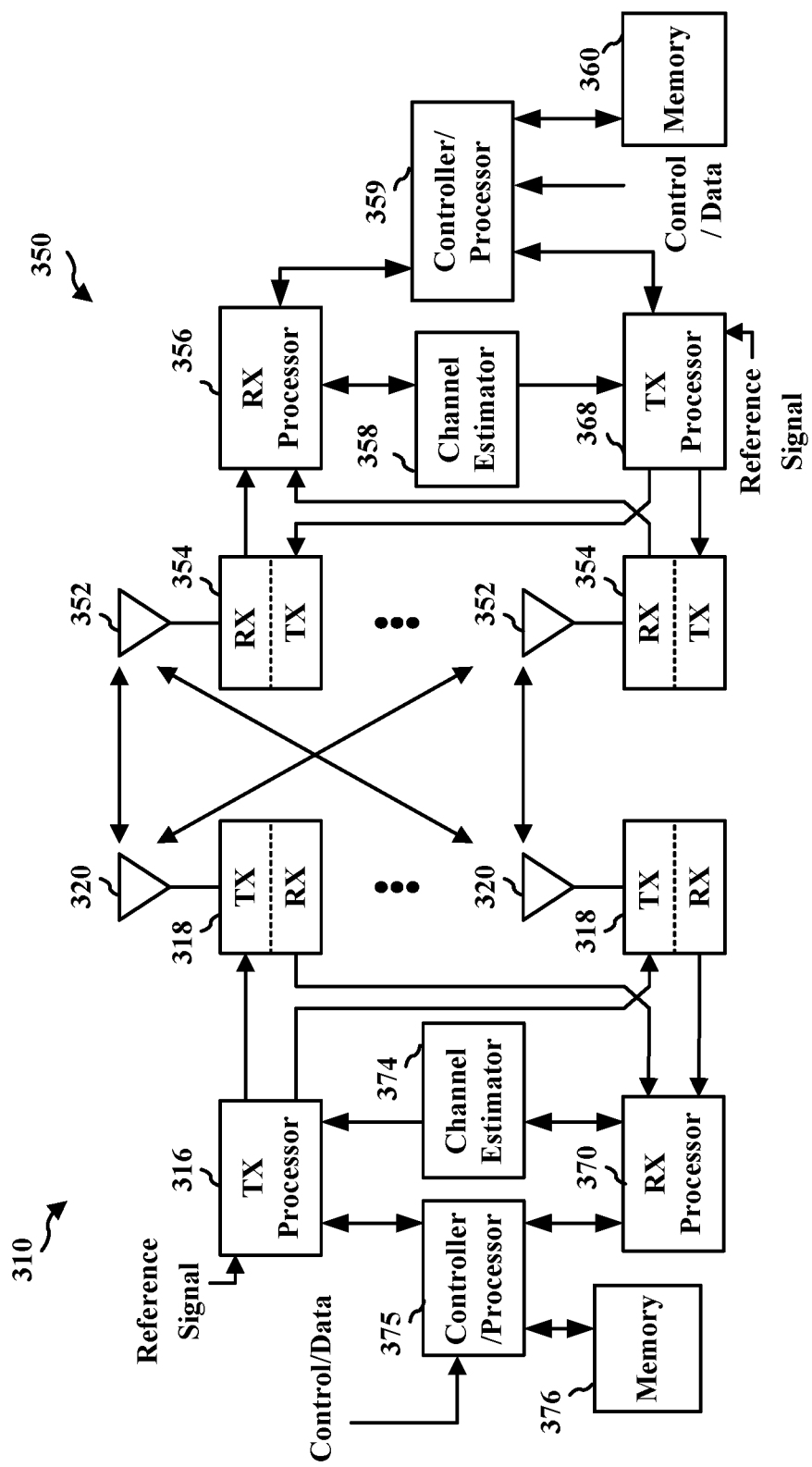
FIG. 3 is a diagram illustrating an example of a base station and user equipment (UE) in an access network.

FIG. 3 is a block diagram of a base station 310 in communication with a UE 350 in an access network. In some aspects, the base station 310 may be an IAB apparatus such as an IAB node or an IAB donor, or may include an IAB apparatus. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Figure 4:
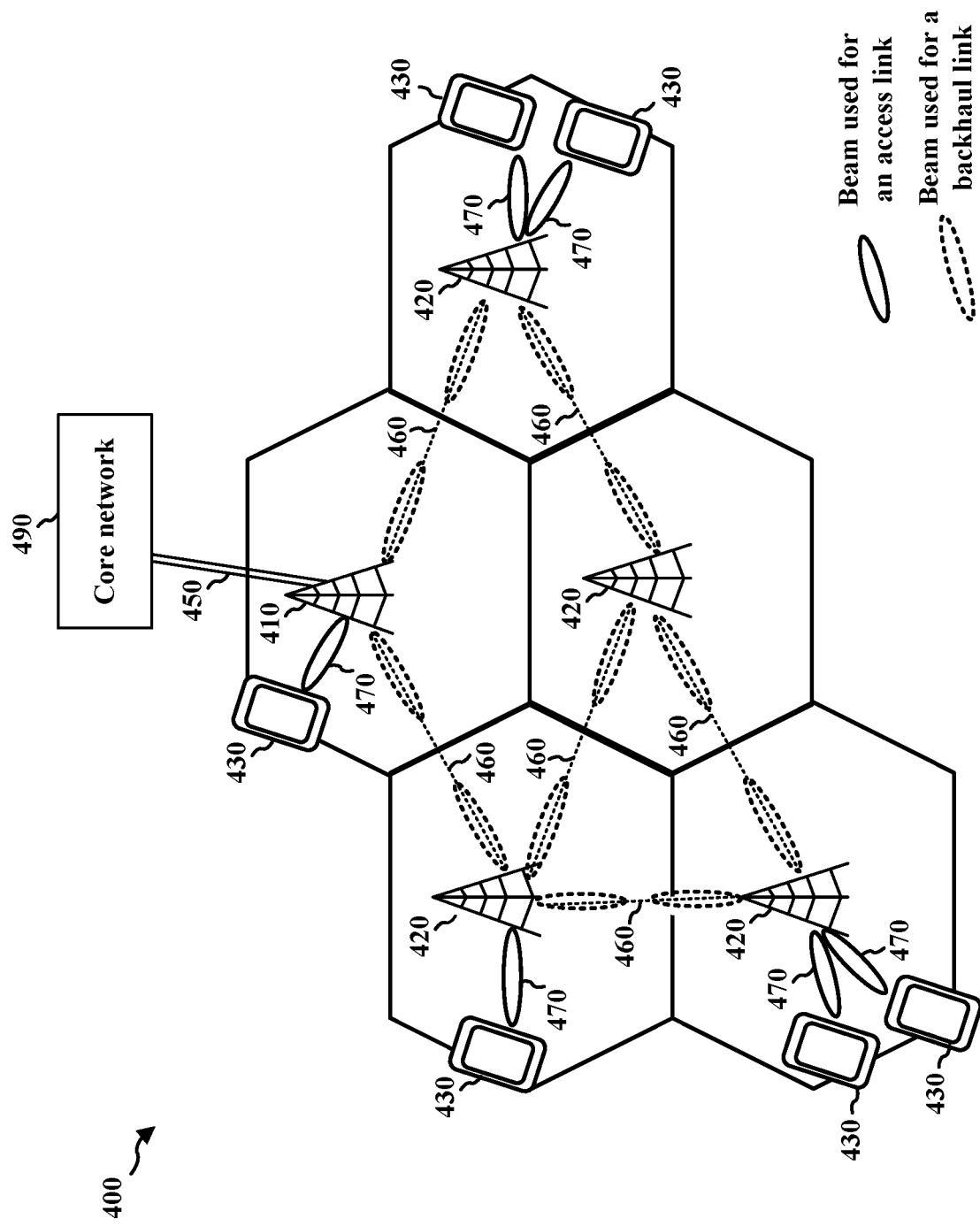
FIG. 4 is a diagram illustrating an integrated access and backhaul (IAB) network.

FIG. 4 is a diagram illustrating an integrated access and backhaul (IAB) network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Figure 5:
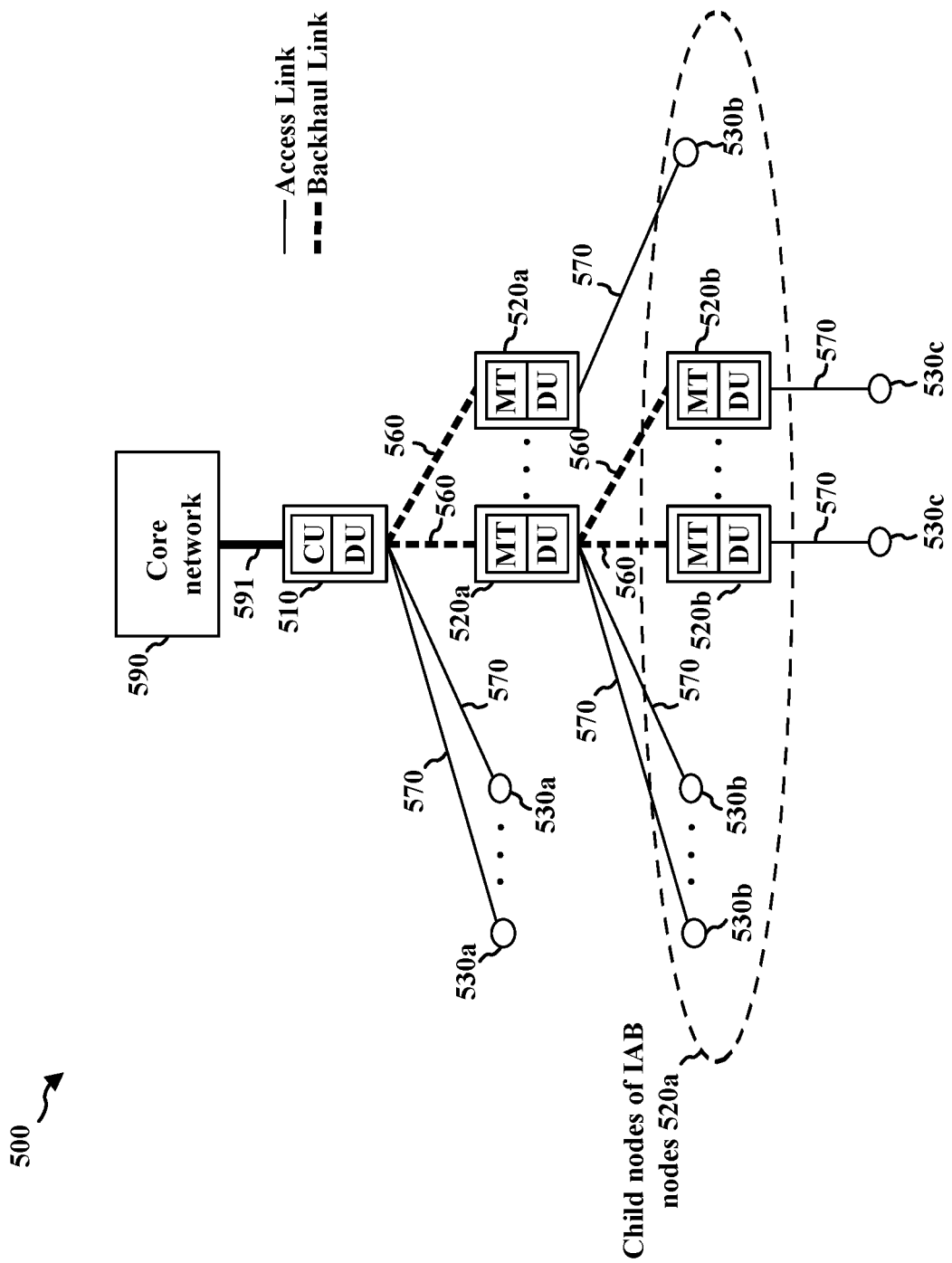
FIG. 5 is a diagram illustrating an IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Figure 6:
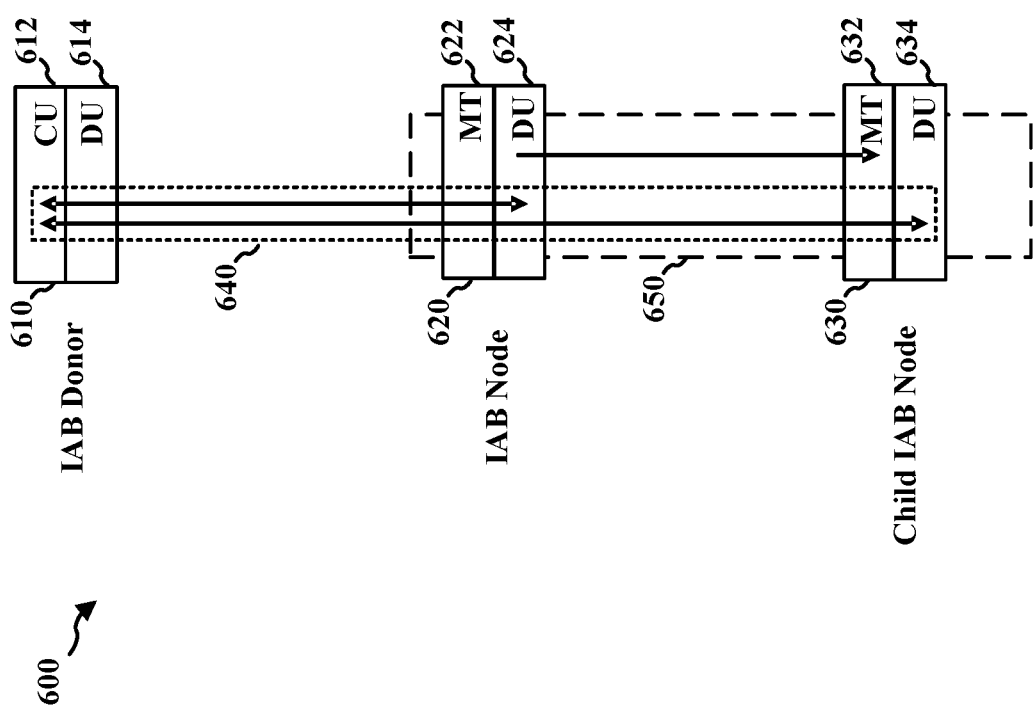
FIG. 6 is a diagram illustrating examples of interaction between an IAB donor, an IAB node, and a child IAB node.

FIG. 6 is a diagram 600 illustrating examples of interaction between an IAB donor 610, an IAB node 620, and a child IAB node 630. The CU 612 of the IAB donor 610 may provide centralized management of the resources available for communication of the IAB nodes. The CU 612 of the IAB donor 610 may allocate the resources semi-statically. Additionally or alternatively, the soft resources of a child node may be controlled in a distributed dynamic fashion by the parent of the child node (e.g., the DU 624 or 614 of the parent node). For example, the DU 624 of the IAB node 620 may allocate the soft resources of the child IAB node 630 through dynamic control signaling.

The MTs 622 and 632 may have resources that are downlink (DL) resources, uplink (UL) resources, or flexible (F) resources. The DUs 614, 624, and 634 may have hard DL resources, hard UL resources, and/or hard F resources. The DUs 614, 624, and 634 may have soft DL resources, soft UL resources, and/or soft flexible resources. In addition to hard or soft resources types, the DUs 614, 624, and 634 may have resources that are not available (NA) type resources.

The CU 612 of the IAB donor 610 may communicate with the DU 624 of the IAB node 620 and the DU 634 of the child IAB node 630 over an F1 interface 640. The F1 interface 640 may support exchaging information with or transferring encapsulated RRC messages to a child IAB node (e.g., the MT of a child of the receiving IAB node) (e.g., transferring an encapsulated RRC message for the child IAB node 630 to the DU 624 of the IAB node 620). In some aspects, the CU 612 may configure the resource pattern of the DU 624 of the IAB node 620 over the F1 interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control the soft resources of the DU 634 of the child IAB node 630 over the Uu air interface 650.

Figure 7:
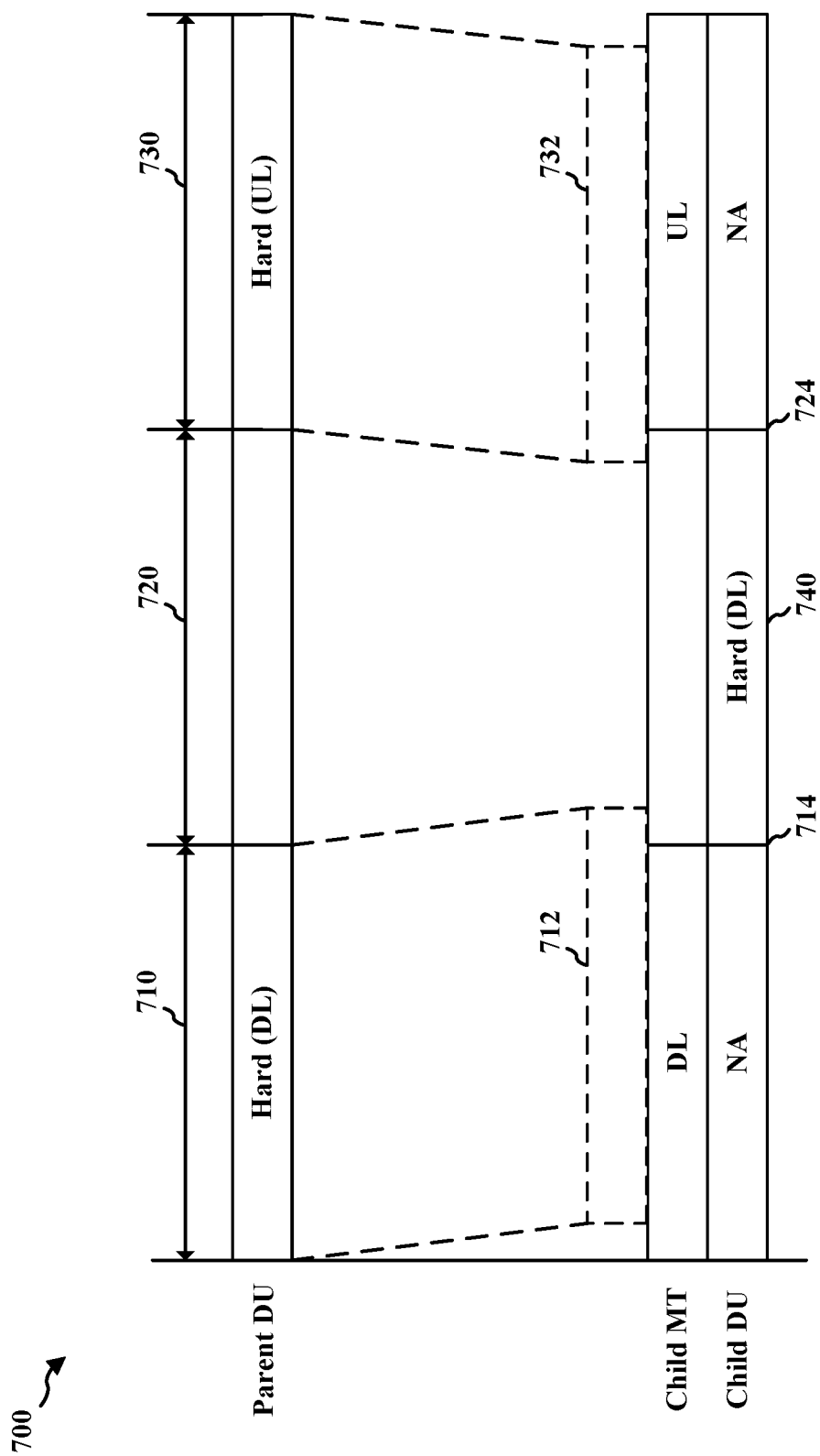
FIG. 7 is a diagram illustrating communication between a child IAB node and its parent.

FIG. 7 is a diagram 700 illustrating communication between a child IAB node and its parent. The child IAB node may be in TDD mode.

An IAB apparatus may utilize its MT to communicate with its parent IAB apparatus (e.g., the DU of the parent IAB node or IAB donor), and may utilize its DU to communicate with its children (e.g., child IAB nodes or UEs). Resources of a DU may be configured as UL, DL, or flexible (F). The DU may transmit downlink information to a grandchild IAB apparatus (e.g., the MT of a child IAB node or a UE) on resources configured as DL. The DU may receive uplink information from the grandchild IAB apparatus on resources configured as UL. The MT may determine whether resources configured as F will be used as DL or UL at a later time, for example based on receiving an indication (e.g, from the parent IAB apparatus or the IAB donor for the IAB network) whether resources configured as F should be used as DL or UL.

Resources of a DU may additionally be configured as hard, soft, or not available (NA), to avoid conflict with resources being utilized by the MT. When a resource is indicated as hard, the DU can assume it can use the resource regardless of the MT's configuration. The DU may determine whether to use the hard resource to communicate with the child IAB apparatus regardless of whether MT has an allocation from the parent IAB apparatus. In some aspects, the DU may decide to ignore the MT's allocation from the parent IAB apparatus and use the hard resource to communicate with its child node. In some aspects, the DU may decide to give priority to the MT to communicate with the parent IAB apparatus and not to use the hard resource to communicate with the grandchild IAB node. When a resource is indicated as NA, it is unavailable for use by the DU. When a resource is indicated as soft, the DU may determine whether it may utilize the resource based on whether doing so would impact the MT transmitting or receiving on the resource. A soft resource may be explicitly or implicitly indicated as available. A soft resource is explicitly indicated as available when a parent IAB apparatus indicates to the child IAB node that the resource will be available (e.g., the parent has not scheduled the MT of the child IAB node to transmit on the soft resource). A soft resource is implicitly indicated as available when the child IAB node determines that it's DU can utilize the soft resources without interfering with transmitting or receiving by the child IAB node's MT (e.g., without indication from the parent IAB apparatus).

The diagram 700 of FIG. 7 illustrates a parent IAB apparatus communicating with a child IAB node on a first set of time domain resources 710, a second set of time domain resources 720, and a third set of time domain resources 730. Specifically, the diagram 700 illustrates the configuration of the DU of the parent IAB apparatus ("Parent DU"), the configuration of the MT of the child IAB node ("Child MT"), and the configuration of the DU of the child IAB node ("Child DU").

The parent IAB node may transmit downlink data to the child IAB node on the first set of resources 710. The first set of resources 710 may be configured as hard for the parent DU to allow the parent DU to decide whether to use the resources 710 to transmit downlink data to the child IAB node regardless of operation of the MT of the parent IAB apparatus. The first set of resources 710 may be configured as DL for the child MT to receive the downlink data from the parent DU. The first set of resources 710 may be configured as NA for the child DU to prevent the child DU from interfering with the child MT receiving the downlink data from the parent DU.

The child IAB node may transmit downlink data to a child entity, such as another IAB node or a UE, on the second set of resources 720. The child DU may be configured as hard for the second set of resources 720, and the parent DU may be configured as NA for the second set of resources 720 so that the child MT and the parent DU may not communicate with one another on the second set of resources 720.

The child IAB node may transmit uplink data to the parent IAB node on the third set of resources 730. The third set of resources 730 may be configured as UL for the child MT to transmit the uplink data to the parent DU. The third set of resources 730 may be configured as NA for the child DU to prevent the child DU from interfering with the child MT transmitting the uplink data to the parent DU. The third set of resources 730 may be configured as hard for the parent DU so that the parent DU can decide whether to use the resources to receive uplink data from the child node regardless of operation of the MT of the parent IAB apparatus.

As the child IAB node is communicating utilizing its MT on the first set of resources 710 and communicating utilizing its DU on the second set of resources 720, the child IAB node performs a transition between its MT and DU at the time 714 between the two sets of resources. Similarly, as the child IAB node is communicating utilizing its DU on the second set of resources 720 and communicating utilizing its MT on the third set of resources 730, the child IAB node performs a transition between its DU and its MT at the time 724 between the two sets of resources.

The parent IAB apparatus and the child IAB node may utilize guard symbols at transition times (e.g., time 714 and time 724). A guard symbol may be a resource on which nothing is transmitted. An IAB node may utilize one or more different component (e.g., different transmitter(s), different receiver(s), or different antenna(s)) and/or different analog beams for its MT and its DU. The guard symbols may provide time for the IAB node to switch between components used for the MT and components used for the DU. The guard symbols may also prevent conflicts due where an MT and a DU of an IAB node are both supposed to be operating at the same time (e.g., due to propagation delay or timing advance).

For example, as illustrated in FIG. 7, although the parent DU transmits downlink data on the first set of resources 710, the transmission may actually be received at the child IAB node on resources 712, slightly delayed from the first set of resources 710. Some of the resources 712 overlap with the second set of resources 720 on which the child MT is configured to transmit downlink data to another device. Guard symbols at the end of the resources 710 provided by the parent DU and/or at the beginning of the resources 740 provided by the child DU may allow the child node to transition from use of the MT to receive downlink data to use of the DU to transmit downlink data without conflict. Uplink data transmitted on resources 732 from the child IAB node to the parent DU may face similar challenges, and guard symbols at the end of resources 740 provided by the child DU and/or at the beginning of resources 730 provided by the parent DU may allow the child IAB node to transition from use of the DU to transmit downlink data to use of the MT to transmit uplink data without conflict.

FIG. 8 is a table 800 illustrating IAB node transition types. A transition type may be based on the configuration of the resources immediately before and immediately after the transition. A given resource may be configured for use by the MT or for use by the DU. Resources configured for use by the MT may be configured for receiving downlink data from a parent (DL Rx) or for transmitting uplink data to the parent (UL Tx). Resources configured for the DU may be configured for transmitting downlink data to a child (DL Tx) or for receiving uplink data from the child (UL Rx).

A transition from using the MT to receive downlink data (DL Rx) to using the DU to transmit downlink data (DL Tx) may be referred to as a Type 1 transition. A transition from using the MT to receive downlink data (DL Rx) to using the DU to receive uplink data (UL Rx) may be referred to as a Type 2 transition. A transition from using the MT to transmit uplink data (UL Tx) to using the DU to transmit downlink data (DL Tx) may be referred to as a Type 3 transition. A transition from using the MT to transmit uplink data (UL Tx) to using the DU to receive uplink data (UL Rx) may be referred to as a Type 4 transition. A transition from using the DU to transmit downlink data (DL Tx) to using the MT to receive downlink data (DL Rx) may be referred to as a Type 5 transition. A transition from using the DU to transmit downlink data (DL Tx) to using the MT to transmit uplink data (UL Tx) may be referred to as a Type 6 transition. A transition from using the DU to receive uplink data (UL Rx) to using the MT to receive downlink data (DL Rx) may be referred to as a Type 7 transition. A transition from using the DU to receive uplink data (UL Rx) to using the MT to transmit uplink data (UL Tx) may be referred to as a Type 8 transition.

The number of guard symbols provided at a transition time may be based on the transition type of the transition. The number of symbols provided for a given transition type may be based on the switching and signal propagation requirements for the transition. For example, in some aspects, transitions of Type 1, 4, 5, and 8 may receive guard symbols to provide for switching from the transmitter to the receiver. In some aspects, transitions of Type 1 and 2 may receive guard symbols to provide for a propagation delay based on the distance from the parent IAB apparatus. In some aspects, transitions of Type 7 and 8 may receive guard symbols to provide for a propagation delay based on the distance from the child IAB node or UE. In some aspects, transitions of Types 1-8 may receive guard symbols to provide for switching antennas. The number of guard symbols provided for a given transition type may be based on a GuardSymbolsDesired signal transmitted from the child IAB node to the parent IAB apparatus and on a GuardSymbolsProvided signal transmitted from the parent IAB apparatus to the child IAB node, which will be discussed further below.

Figure 9:
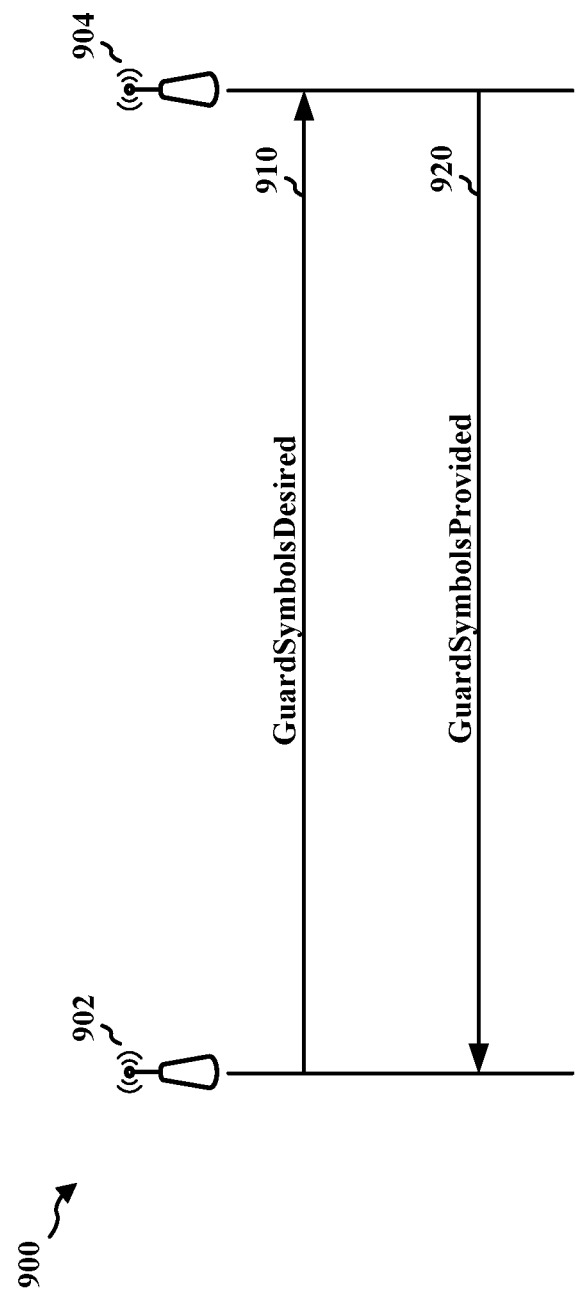
FIG. 9 is a communication diagram illustrating guard symbol signaling between a child IAB node and a parent IAB apparatus.

FIG. 9 is a communication diagram 900 illustrating guard symbol signaling between a child IAB node 902 and a parent IAB apparatus 904. The guard symbols for a transition may be located at the resources immediately before the transition, the resources immediately after the transition, or may be split between both the resources immediately before and immediately after the transition. The child IAB node 902 and the parent IAB apparatus 904 may communicate to determine how many of the guard symbols will be provided by the child IAB node 902 and how many of the guard symbols will be provided by the parent IAB apparatus 904.

The child IAB node 902 may have a set of GuardSymbolDesired values corresponding to different transition types, such as the Types 1-8 described above with respect to FIG. 8. The GuardSymbolsDesired values may identify the number of guard symbols which should be provided for the child IAB node 902 to perform a transition of that type. The child IAB node 902 may transmit a GuardSymbolsDesired signal 910 to the parent IAB apparatus 904. The GuardSymbolsDesired signal 910 may include some or all of the GuardSymbolsDesired values corresponding to transmission types. In some aspects, the GuardSymbolsDesired signal 910 may include one or more media access control (MAC) control elements (MAC CEs). In some aspects, if a value is not included for a transition type, zero guard symbols may be provided for that transition type.

The parent IAB apparatus 904 may transmit a GuardSymbolsProvided signal 920 to the child IAB node 902. The GuardSymbolsProvided signal 920 may include GuardSymbolsProvided values corresponding to transition types, such as transition Types 1-8. The GuardSymbolsProvided value for a transition type may indicate a number of guard symbols which the parent IAB apparatus 904 will provide when the child IAB node 902 performs a transmission of that type. The value included in the GuardSymbolsProvided signal 920 for a transition type may be equal to or less than the value included in the GuardSymbolsDesired signal 910 for that transition type. In some aspects, the value included in the GuardSymbolsProvided signal 920 may be based on resource utilization and/or performance impact. In some aspects, if no value is included for a transition type, the parent IAB apparatus 904 may provide zero guard symbols for transitions of that type.

When the child IAB node 902 performs a transition between use of its MT and use of its DU, the child IAB node 902 and the parent IAB apparatus 904 will provide guard symbols based on the GuardSymbolsDesired and GuardSymbolsProvided values. As a transition is between use of the DU of the child IAB node 902 and use of the MT of the child IAB node 902, the transition will be adjacent to one set of resources allocated to the MT for communication between the child IAB node 902 and the parent IAB apparatus 904, and a second set of resources allocated to the DU for communication between the child IAB node 902 and a child if the child IAB node 902. The parent IAB apparatus 904 and the child IAB node 902 will not transmit or receive on guard symbols allocated to the MT, the number of which will be based on the GuardSymbolsProvided value for that transition type. The child IAB node 902 will not transmit or receive on guard symbols allocated to the DU, the number of which will be based on the value for GuardSymbolsProvided and the value for GuardSymbolsDesired for that transition type. In some aspects, the number of guard symbols provided on the DU by the child IAB node 902 may be the difference between the GuardSymbolsDesired and the GuardSymbolsProvided.

Figure 10:
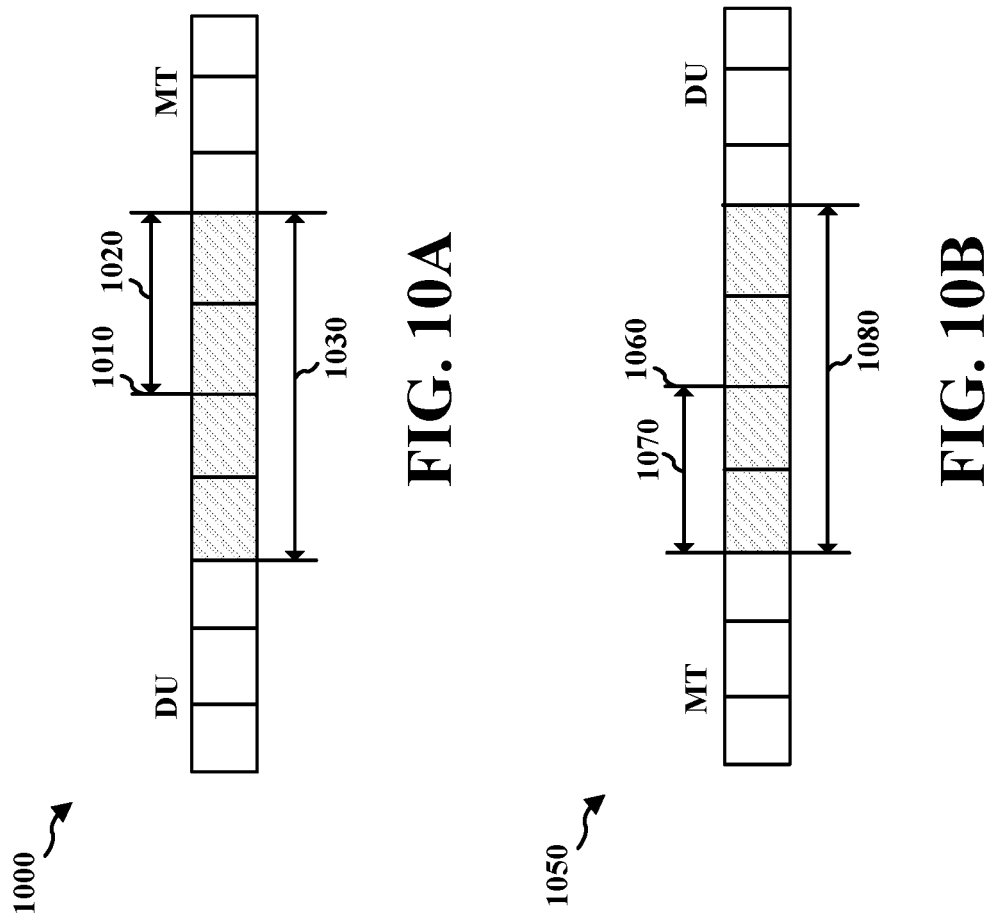
FIG. 10A is a diagram illustrating guard symbols at a transition from DU to MT.
FIG. 10B is a diagram illustrating guard symbols at a transition from MT to DU.

For example, FIG. 10A is a diagram 1000 illustrating guard symbols at a transition from DU to MT. The child IAB node may transition from use of its DU to use of its MT at a transition time 1010. The GuardSymbolsDesired value for transitions of the transition type may be four, and the GuardSymbolsProvided value may be two. Because the GuardSymbolsProvided value is two, neither the parent IAB apparatus nor the child IAB node transmit on the two symbols 1020 following the transition time 1010. Because the GuardSybolsDesired value is four and two guard symbols are being provided on the resources after the transition time 1010, the child IAB node may not transmit or receive on the two symbols before the transition time 1010, resulting in four guard symbols 1030 for the transition. The child IAB node may switch from operation of its DU to operation of its MT during the time associated with the four guard symbols 1030.

In another example, FIG. 10B is a diagram 1050 illustrating guard symbols at a transition from MT to DU. The child IAB node may transition from use of its MT to use of its DU at a transition time 1060. The GuardSymbolsDesired value for transitions of the transition type may be four, and the GuardSymbolsProvided value may be two. Because the GuardSymbolsProvided value is two, neither the parent IAB apparatus nor the child IAB node transmit on the two symbols 1070 before the transition time 1060. Because the GuardSybolsDesired value is four and two guard symbols are being provided on the resources before the transition time 1060, the child IAB node may not transmit or receive on the two symbols after the transition time 1060, resulting in four guard symbols 1080 for the transition. The child IAB node may switch from operation of its MT to operation of its DU during the time associated with the four guard symbols 1080.

Figure 11:
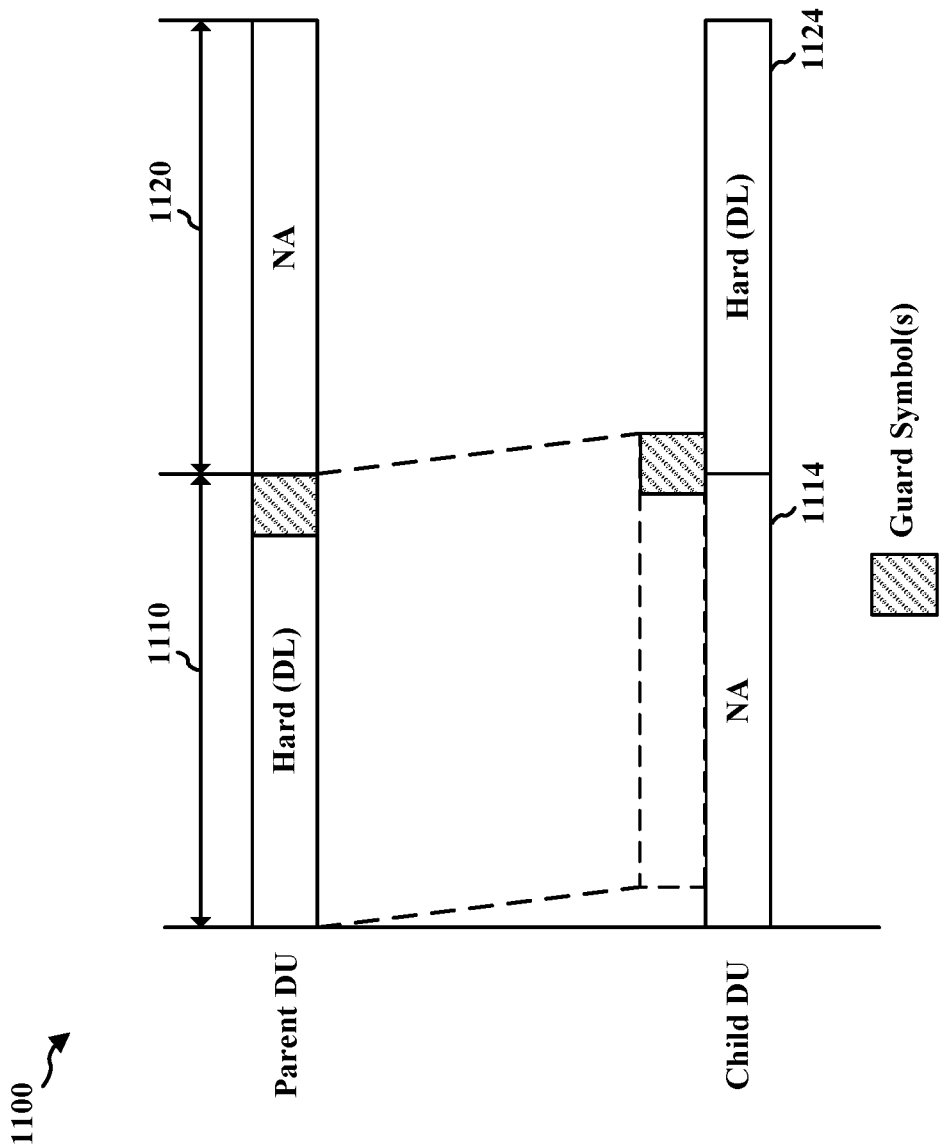
FIG. 11 is a diagram illustrating communication between a child IAB node and its parent.

FIG. 11 is a diagram 1100 illustrating communication between a child IAB node and its parent.

As described above, a parent IAB apparatus may provide guard symbols to allow a child IAB node to transition between use of its MT and its DU. GuardSymbolsDesired may indicate the number of guard symbols desired by the child IAB node from the parent IAB apparatus at each transition instance based on the transition type, and GuardSymbolsProvided may indicate the number of guard symbols provided by the parent IAB apparatus at each transition instance based on the transition type. Both the parent IAB apparatus and the child IAB node should make the same determination regarding when a transition instance occurs and the transition type of the transition so that the parent IAB apparatus can include the appropriate number of guard symbols and the child can properly utilize the provided guard symbols. Accordingly, the parent IAB apparatus and the child IAB node should use the same information to determine transition instances and transition types.

A transition type, as described above with respect to FIG. 8, may be defined based on the transmit or receive state of the child MT and child DU. The child MT is scheduled by the parent IAB apparatus, and the state of the child MT may be known by both the parent IAB apparatus and the child IAB node. The transmit or receive state of the child DU may be based on the scheduling decision of the child IAB node, which may not be known to the parent IAB apparatus.

For example, as shown in FIG. 11, during a first time period 1110, resources 1114 may be configured as hard for the DU of the parent IAB apparatus to transmit downlink data to the MT of the child IAB node, and the resources 1114 may be configured as NA for the DU of the child IAB node to prevent interference with the MT of the child IAB node's receiving of the downlink data. During a second time period 1120, resources 1124 may be configured as NA for the DU of the parent IAB apparatus and may be configured as hard for the DU of the child IAB node to transmit downlink data to a child of the child IAB node. During the first time period 1110, the parent IAB node knows that the child IAB node is utilizing its MT. During the second time period 1120, the child IAB node may utilize the resources 1124 to transmit utilizing its DU, or may not transmit on the resources 1124. If the child IAB node does transmit on the resources 1124 then it will transition from utilizing its MT during time period 1110 to utilizing its DU in time period 1120. If the child IAB node does not transmit on the resources 1124 then it will not transition. Because the parent IAB apparatus does not know whether the child IAB node will transmit on the resources 1124, the parent IAB apparatus cannot determine whether the child IAB node will actually transition between use of its MT and use of its DU.

The parent IAB apparatus may know the child DU's resource configuration (hard/soft/NA, DL/UL/F), the child DU's cell-specific signals (e.g., a synchronization signal block (SSB), a channel state information reference signal (CSI-RS), a physical random access channel (PRACH), a scheduling request (SR)), and the child DU's NA or soft resources with cell-specific signals will be treated as configured as hard. In some aspects, the parent IAB apparatus may identify a potential transition instance based on the child DU's resource configuration and may apply guard symbols based on the identified potential transition instance. As the child DU's actual transmit or receive state may be unknown to the parent IAB apparatus, the parent IAB apparatus may not be able to accurately determine transition instances, which are only a subset of potential transition instances that can be identified by the parent IAB apparatus.

In some aspects, the parent IAB apparatus may determine whether to provide guard symbols based on whether the configuration of resources at the DU of the child IAB node suggest that the resources will be used by the MT of the child IAB node (e.g, are associated with use of the MT of the child IAB node) or suggest the resources will be used by the DU of the child IAB node (e.g., are associated with use of the DU of the child IAB node). For example, the parent IAB apparatus may determine to provide guard symbols at a transition time when the DU of the child IAB node will transition between resources associated with use of the MT of the child IAB node and resources associated with the use of the DU of the child IAB node at the transition time.

In some aspects, a resource may be "a resource associated with use of the MT of the child IAB node" if the resource is configured as NA or is configured as soft not explicitly available for the DU of the child IAB node, where the MT of the child IAB node is allocated to communicate with the parent IAB apparatus. A resource may be "a resource associated with use of the DU of the child IAB node" if the resources is configured as hard or soft explicitly indicated as available for the DU of the child IAB node.

In some aspects, transitions between resources associated with use of the MT and resources associated with use of the DU the can include four cases: Case 1, where resources of the DU of the child IAB node transition between being configured as NA (and the MT of the child IAB node is allocated to communicate with the parent IAB apparatus) and being configured as hard; Case 2, where the resources of the DU of the child IAB node transition between being configured as NA (and the MT of the child IAB node is allocated to communicate with the parent IAB apparatus) and being configured as soft explicitly indicated as available; Case 3, where the resources of the DU of the child IAB node transition between being configured as soft not explicitly indicated as available (and the MT of the child IAB node is allocated to communicate with the parent IAB apparatus) and being configured as hard; and Case 4, where the resources of the DU of the child IAB node transition between being configured as soft not explicitly indicated as available (and the MT of the child IAB node is allocated to communicate with the parent IAB apparatus) and being configured as soft explicitly indicated as available.

In some aspects, the parent IAB apparatus may identify potential transition instances of the child IAB node and provide guard symbols based on whether the change of the configuration of the resources at the child DU falls into one of Cases 1-4. In some aspects, the parent IAB apparatus may identify a potential transition instance of the child IAB node and provide guard symbols in all of Cases 1-4. In some aspects, the parent IAB apparatus may identify a potential transition instance of the child IAB node and provide guard symbols in any subset of Cases. For example, in some aspects, the parent IAB apparatus may identify a potential transition instance of the child IAB node and provide guard symbols for Cases 2-4, which involve soft resource and may not identify a potential transition instance of the child IAB node and provide guard symbols for Case 1, or may identify a potential transition instance of the child IAB node and provide guard symbols for Case 1 but may not identify a potential transition instance of the child IAB node and provide guard symbols for Cases 2-4.

Figure 12:
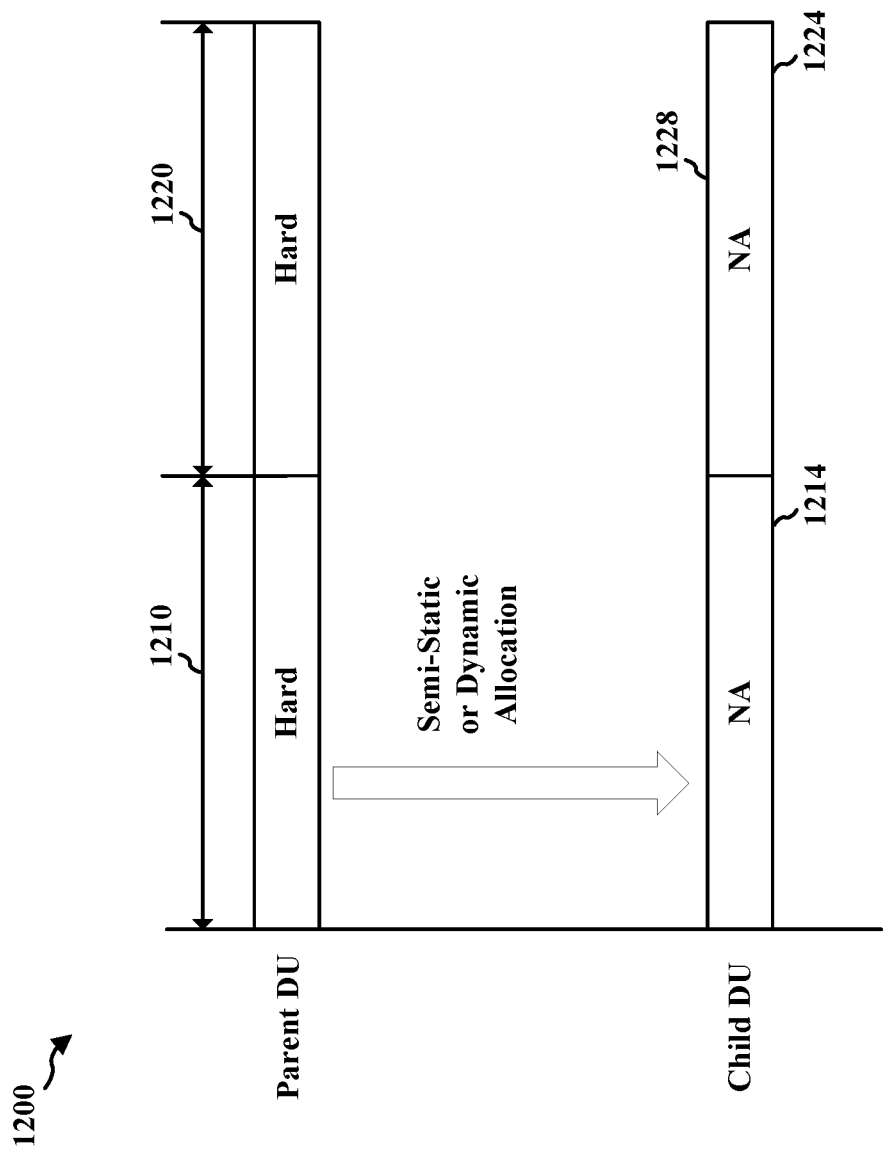
FIG. 12 is a diagram illustrating communication between a child IAB node and its parent, including DU resources with cell-specific signals.

FIG. 12 is a diagram 1200 illustrating communication between a child IAB node and its parent, including DU resources with cell-specific signals. In some aspects, resources configured as NA or soft for the DU of a child IAB node may be treated as hard when a cell-specific signal is allocated to one of the resources (e.g., may be resources associated with use of the DU of the child IAB node). The configuration may be available to the parent IAB apparatus. In some aspects, where a set of resources is configured as NA or soft for the DU of the child IAB node with a cell-specific signal allocated to a resource of the set of resources, the set of resources may be associated with use of the DU. The parent IAB node may provide guard symbols accordingly.

For example, in FIG. 12, the parent DU is configured as hard and the child DU is configured as NA for a first set of resources 1214 in a first time period 1210. The parent DU may communicate with the MT of the child IAB node on the resources 1214. The child DU may be semi-statically or dynamically allocated as NA. The parent DU is configured as hard and the child DU is configured as NA for a second set of resources 1224 in a second time period 1220.

The resources 1214 may be associated with use of the MT because the resources 1214 are configured as NA for the child DU and the child MT is allocated to communicate with the parent DU.

A cell-specific signal for the child IAB node may be allocated to at least one resource 1228 of the resources 1224. Accordingly, because the resources 1224 are configured as NA for the child DU but a resource 1228 of the resources 1224 is configured to receive a cell-specific signal for the child DU, the resources 1224 may be associated with use of the DU.

Because the resources 1214 are associated with use of the MT and the resources 1224 are associated with use of the DU, the parent IAB apparatus may provide guard symbols at the transition between the resources 1214 and the resources 1224.

Figure 13:
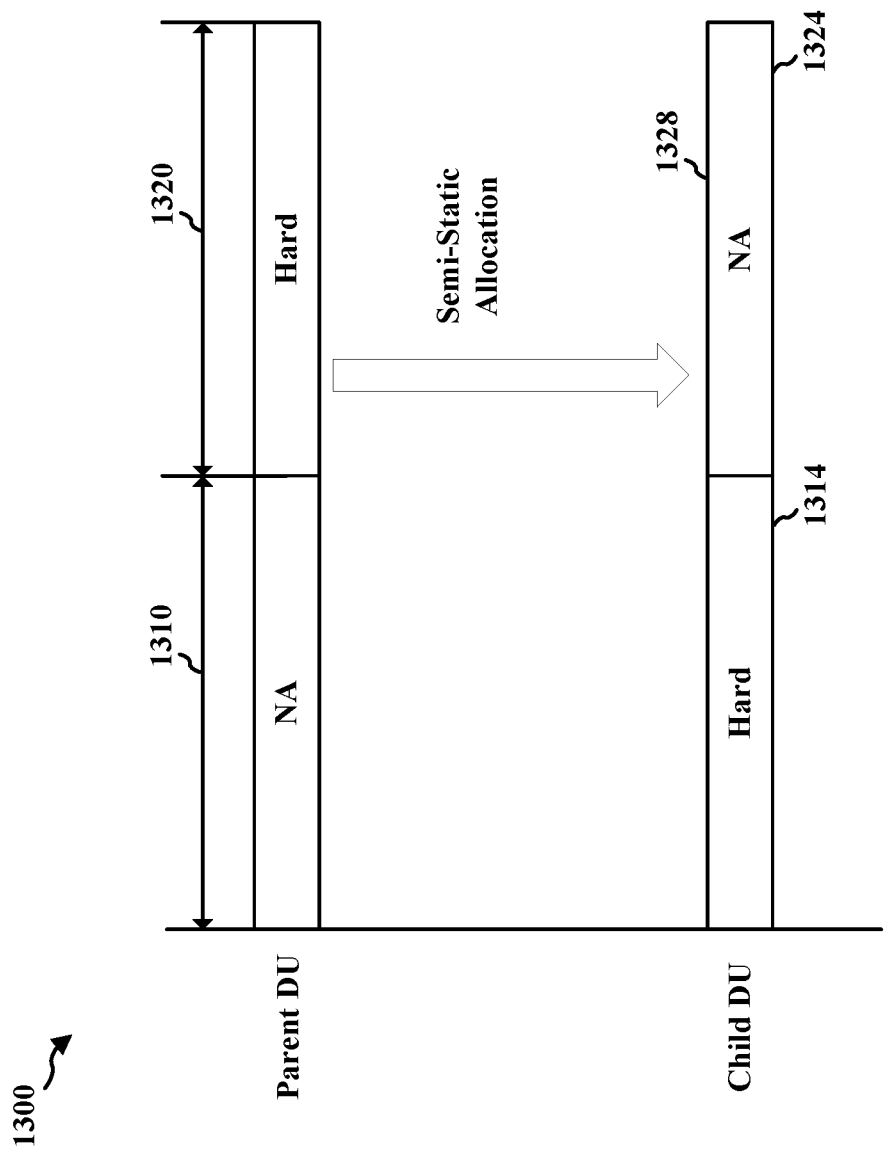
FIG. 13 is a diagram illustrating communication between a child IAB node and its parent, including DU resources with cell-specific signals.

FIG. 13 is a diagram 1300 illustrating communication between a child IAB node and its parent, including DU resources with cell-specific signals.

In FIG. 13, the parent DU is configured as NA and the child DU is configured as hard for a first set of resources 1314 in a first time period 1310. The parent DU may communicate with the MT of the child IAB node on the resources 1314. The parent DU is configured as hard and the child DU is configured as NA for a second set of resources 1324 in a second time period 1320. The child DU may be semi-statically allocated as NA.

The resources 1314 may be resources associated with use of the DU of the child IAB node because the resources 1314 are configured as hard for the child DU.

A cell-specific signal for the child IAB node may be allocated to at least one resource 1328 of the resources 1324. Accordingly, because the resources 1324 are configured as NA for the child DU but a resource 1328 of the resources 1324 is configured to receive a cell-specific signal for the child DU, the resources 1324 may be resources associated with use of the DU of the child IAB node.

Because the resources 1314 are associated with use of the DU and the resources 1324 are associated with use of the DU, the parent IAB apparatus may not identify a potential transition instance and/or may not provide guard symbols at the transition between the resources 1314 and the resources 1324.

Figure 14:
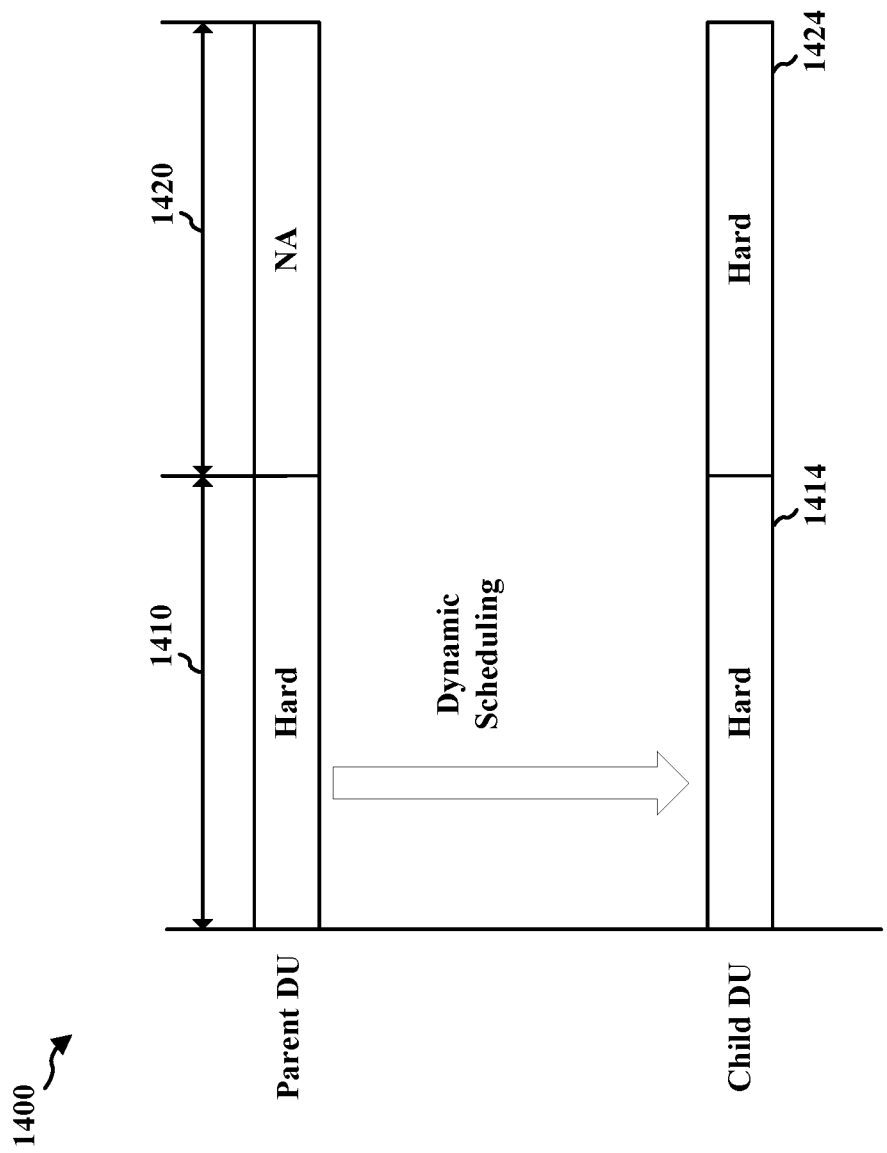
FIG. 14 is a diagram 1400 illustrating communication between a child IAB node and its parent, including dynamically scheduled resources.

FIG. 14 is a diagram 1400 illustrating communication between a child IAB node and its parent, including dynamically scheduled resources.

In some aspects, such as where a child MT is dynamically scheduled by the parent IAB apparatus to communicate with the parent DU, a parent DU and a child DU may receive conflicting resource allocations. For example, a resource may be configured as hard for a parent DU and as hard for a child DU. Where a resources is scheduled as hard for both the parent DU and the child DU, the child IAB node (e.g., the child DU) may determine whether to give priority to the child MT to communicate with the parent DU or to give priority to the child DU to communicate with a grandchild IAB apparatus (e.g., a child IAB apparatus of the child IAB node). In some aspects, where the child MT is dynamically scheduled to communicate with the parent DU on a set of resources that is configured as hard or as soft explicitly indicated as available for the child DU, and where there is no cell-specific signal for the child DU allocated to the set of resources, the resources may be resources associated with use of the MT of the child IAB node.

For example, in FIG. 14, the child DU may be configured as hard for resources 1414 in a first time period 1410. The parent IAB apparatus may dynamically schedule one or more resource of the resources 1414 for the child MT to communicate with the parent DU during the time period 1410, and the resources 1414 may be configured as hard for the parent DU. There may not be any cell-specific signals for the child IAB node allocated to the resources 1414. The parent DU may be configured as NA for resources 1424 in a second time period 1420, and the child DU may be configured as hard for the resources 1424 in the second time period 1420.

Because the resources 1414 are configured as hard for the child DU, the child MT is dynamically scheduled to communicate with the parent DU on the resources 1414, and there is no cell-specific signal for the child DU allocated to the resources 1414, the resources 1414 may be resources associated with use of the MT of the child IAB node.

The resources 1424 may be associated with use of the DU because the resources 1424 are configured as hard for the child DU.

Because the resources 1414 are associated with the use of the MT and the resources 1424 are associated with the use of the DU, the parent IAB apparatus may identify a potential transition instances and/or may provide guard symbols at the transition between the resources 1414 and the resources 1424.

Figure 15:
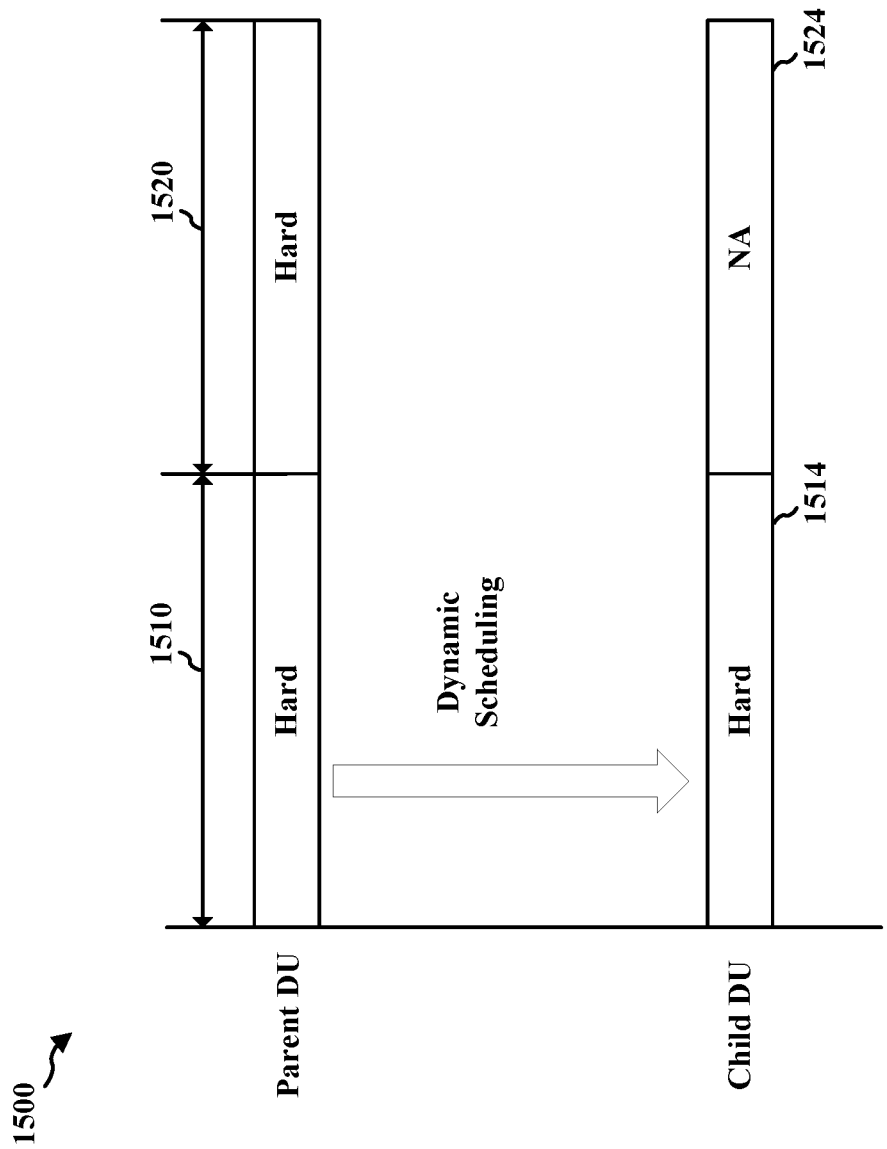
FIG. 15 is a diagram illustrating communication between a child IAB node and its parent, including dynamically scheduled resources.

FIG. 15 is a diagram 1500 illustrating communication between a child IAB node and its parent, including dynamically scheduled resources. In FIG. 15, the child DU may be configured as hard for resources 1514 in a first time period 1510. The parent IAB apparatus may dynamically schedule one or more resource of the resources 1514 for the child MT to communicate with the parent DU during the time period 1510, and the resources 1514 may be configured as hard for the parent DU. There may not be any cell-specific signals for the child IAB node allocated to the resources 1514. The parent DU may be configured as hard for resources 1524 in a second time period 1520, the child DU may be configured as NA for the resources 1524 in the second time period 1520, and the child MT may be allocated to communicate with the parent DU on the resources 1524 during the time period 1520.

Because the resources 1514 are configured as hard for the child DU, the child MT is dynamically scheduled to communicate with the parent DU on the resources 1514, and there is no cell-specific signal for the child DU allocated to the resources 1514, the resources 1514 may be resources associated with use of the MT of the child IAB node.

The resources 1524 may be associated with use of the MT because the resources 1524 are configured as hard for the child DU.

Because the resources 1514 are associated with the use of the MT and the resources 1524 are associated with the use of the MT, the parent IAB apparatus may not identify a potential transition instances and/or may not provide guard symbols at the transition between the resources 1514 and the resources 1524.

When a parent IAB apparatus provides guard symbols, the parent IAB apparatus and the child IAB node may abstain from transmitting on the guard symbols. The parent IAB apparatus may be allocated to transmit or receive cell-specific signals, such as a synchronization signal block (SSB), a periodic channel state information reference signal CSI-RS, a physical random access channel (PRACH), or a scheduling request (SR). The parent IAB apparatus may have one or more cell-specific signal for the parent IAB apparatus scheduled for a resources which the parent has determined to provide as a guard symbol. In some aspects, where a cell-specific signal for the parent IAB apparatus is allocated for a resource which the parent IAB apparatus has determined to provide as a guard symbol, the parent IAB node may cancel providing the guard symbol. The parent IAB node may then transmit or receive the cell-specific signal on the cancelled guard symbol. In some aspects, the child IAB node may also transmit or receive on the cancelled guard symbol.

The MT of a parent IAB apparatus may allocate resources for communication with a child IAB node through dynamic scheduling. In some aspects, a dynamic scheduling grant may conflict with provided guard symbols. For example, in some aspects, a dynamic scheduling grant may utilize slot based allocation, the dynamically scheduled resources may begin within the first three or four resources of the beginning of the slot, and the parent IAB apparatus may provide between zero and four guard symbols at the beginning of a slot where the slot includes MT associated resources and the previous slot included DU associated resources. In some aspects, where the parent IAB node determines to provide guard symbols in a slot which the parent IAB node is dynamically scheduling, the parent IAB node may determine to provide a number of guard symbols such that the number of guard symbols is less than or equal to the number of guard symbols before the resources scheduled by the dynamic scheduling grant. In some aspects, where the parent IAB node determines to provide guard symbols in a slot which the parent IAB node is dynamically scheduling, the parent IAB node may determine whether the dynamic scheduling grant overlaps with the provided guard symbols and may determine to cancel the dynamic scheduling grant if it overlaps with the provided guard symbols. In some aspects, where a child IAB node receives a dynamic scheduling grant from a parent IAB apparatus which conflicts with guard symbols provided by the parent IAB node, the child IAB node may discard the received dynamic scheduling grant.

A child IAB node may be scheduled to transmit or receive a physical downlink shared channel (PDSCH) or a physical uplink shared channel (PUSCH). In some aspects, where the child IAB node is scheduled to transmit or receive the PDSCH or the PUSCH on a resource which the parent IAB node has provided as a guard symbol, the child IAB apparatus may puncture the provided guard symbol and may attempt to receive the PDSCH or transmit the PUSCH on the punctured guard symbols.

Figure 16:
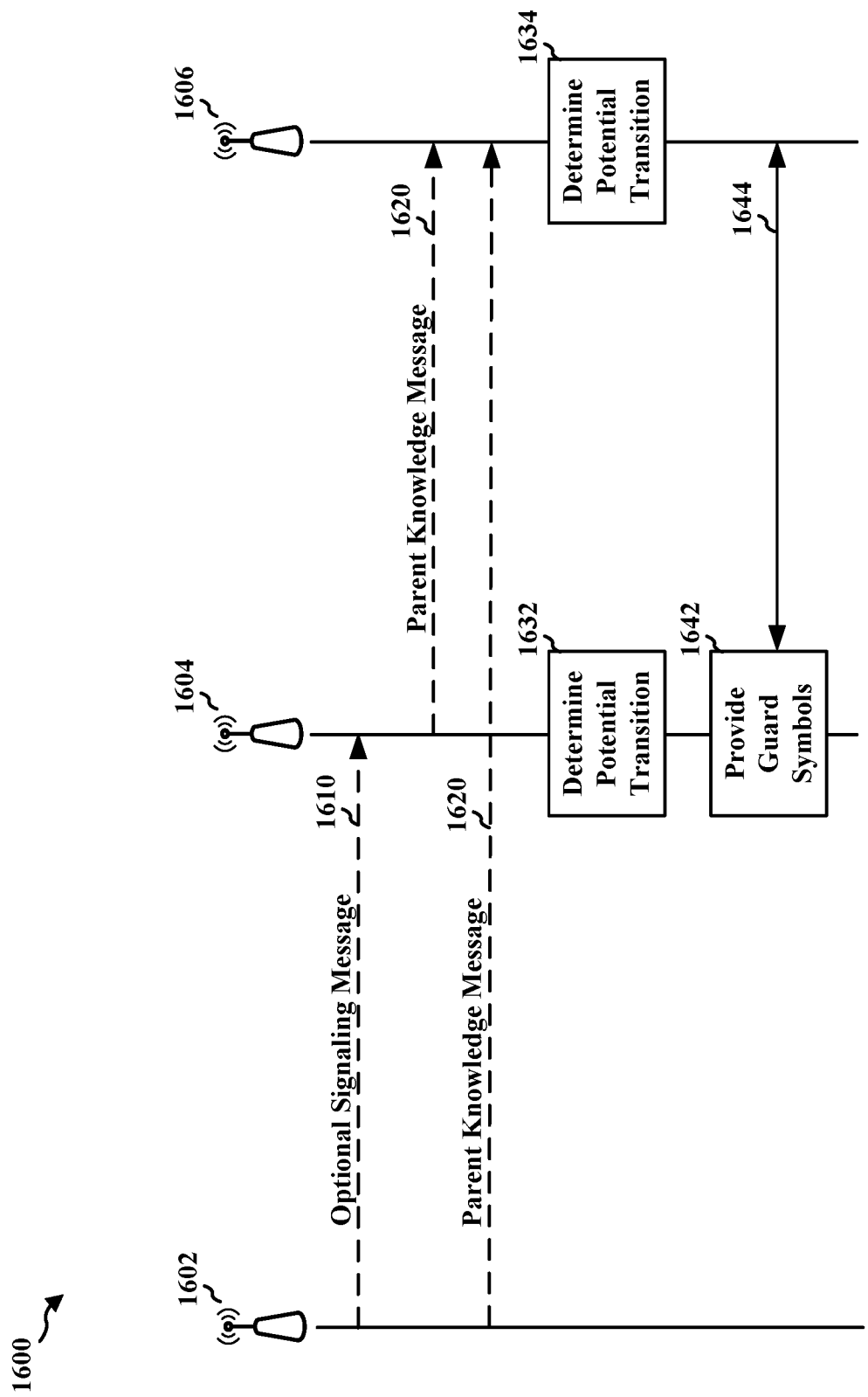
FIG. 16 is a communication flow diagram illustrating provision of guard symbols based on optional signaling.

FIG. 16 is a communication flow diagram 1600 illustrating provision of guard symbols based on optional signaling. An IAB network includes an IAB donor 1602, a parent IAB node 1604, and a child IAB node 1606.

As described above, actual transition instances between the MT and the DU of the child IAB node 1606 may depend on a dynamic decision of the child IAB node 1606 which is not known to the parent IAB node 1604, so the parent IAB node 1604 and the child IAB node 1606 may identify potential transition instances of the child IAB node 1606, and the parent IAB node 1604 may provide a number of guard symbols based on the configuration of the resources before and after the transition. For example, the number of guard symbols provided at a potential transition instance may be based on the MT slot configuration and scheduling information of the child IAB node 1606, the DU resource configuration of the child IAB node 1606, the allocation of selected cell specific signals or channels for the DU of the child IAB node 1606, and/or explicit availability of soft resources of the child IAB node 1606.

The child IAB node 1606 and the parent IAB node 1604 may determine the number of guard symbols that will be provided by the parent IAB node 1604 independently. To come to the same conclusion, the child IAB node 1606 and the parent IAB node 1604 may utilize the same information in determining potential transition instances and classifying the transition instances (e.g., may utilize information available at both the child IAB node 1606 and the parent IAB node 1604). Some information which may be useful in determining or classifying potential transition instances (e.g., the DU resource configuration of the child IAB node 1606 or the allocation of selected cell specific signals or channels for the DU of the child IAB node 1606) may be optionally available at the parent IAB node 1604, but not necessarily available at the parent IAB node 1604.

The CU of the IAB donor 1602 may or may not transmit an optional signaling message 1610 to the parent IAB node 1604. The optional signaling message 1610 may communicate, to the parent IAB node 1604, information which may be useful in determining or classifying potential transition instances of the child IAB node 1606. For example, the optional signaling message 1610 may communicate the DU resource configuration of the child IAB node 1606 or the allocation of selected cell specific signals or channels for the DU of the child IAB node 1606 to the parent IAB node 1604. In some aspects, there may be multiple optional signaling messages which the CU of the IAB donor 1602 may transmit to the parent IAB node 1604, and each may or may not be transmitted independently of the others.

A parent knowledge message 1620 may be transmitted to the child IAB node 1606. The parent knowledge message 1620 may be transmitted by the CU of the IAB donor 1602 (e.g., as an RRC or F1-AP message on the F1 interface) or may be transmitted by the parent IAB node 1604 (e.g., as a media access control control element (MAC-CE)). The parent knowledge message 1620 may indicate to the child IAB node 1606 whether the parent IAB node 1604 has the information useful to determining or classifying potential transition instances. In some aspects, the parent knowledge message 1620 may indicate whether the optional signaling message 1610 was transmitted (or, in the case of multiple optional signaling messages, which optional signaling messages were transmitted). In some aspects, the parent knowledge message 1620 may indicate a rule set to use in determining and/or classifying transition instances, and the rule set may be selected based on the information made available to the parent IAB node 1604 by the optional signaling message 1610. In some aspects, the parent knowledge message 1620 may include an indication of the location of incoming potential transition instances.

As illustrated at 1632, the parent IAB node 1604 may determine a potential transition instance for the child IAB node 1606, and may determine a number of guard symbols to provide at the potential transition instance. The determinations may be made based on information received in the optional signaling message 1610, if the optional signaling message 1610 was received from the IAB donor 1602. As illustrated at 1634, the child IAB node 1606 may independently determine a potential transition instance for the child IAB node 1606 and may determine a number of guard symbols to be provided by the parent IAB node 1604. The determinations may be made based on the same information used by the parent IAB node 1604, based on the parent knowledge message 1620. As illustrated at 1642, the parent IAB node 1604 may provide the determined number of guard symbols on a transmission 1644 between the child IAB node 1606 and the parent IAB node 1604 at the potential transition instance.

Figure 17:
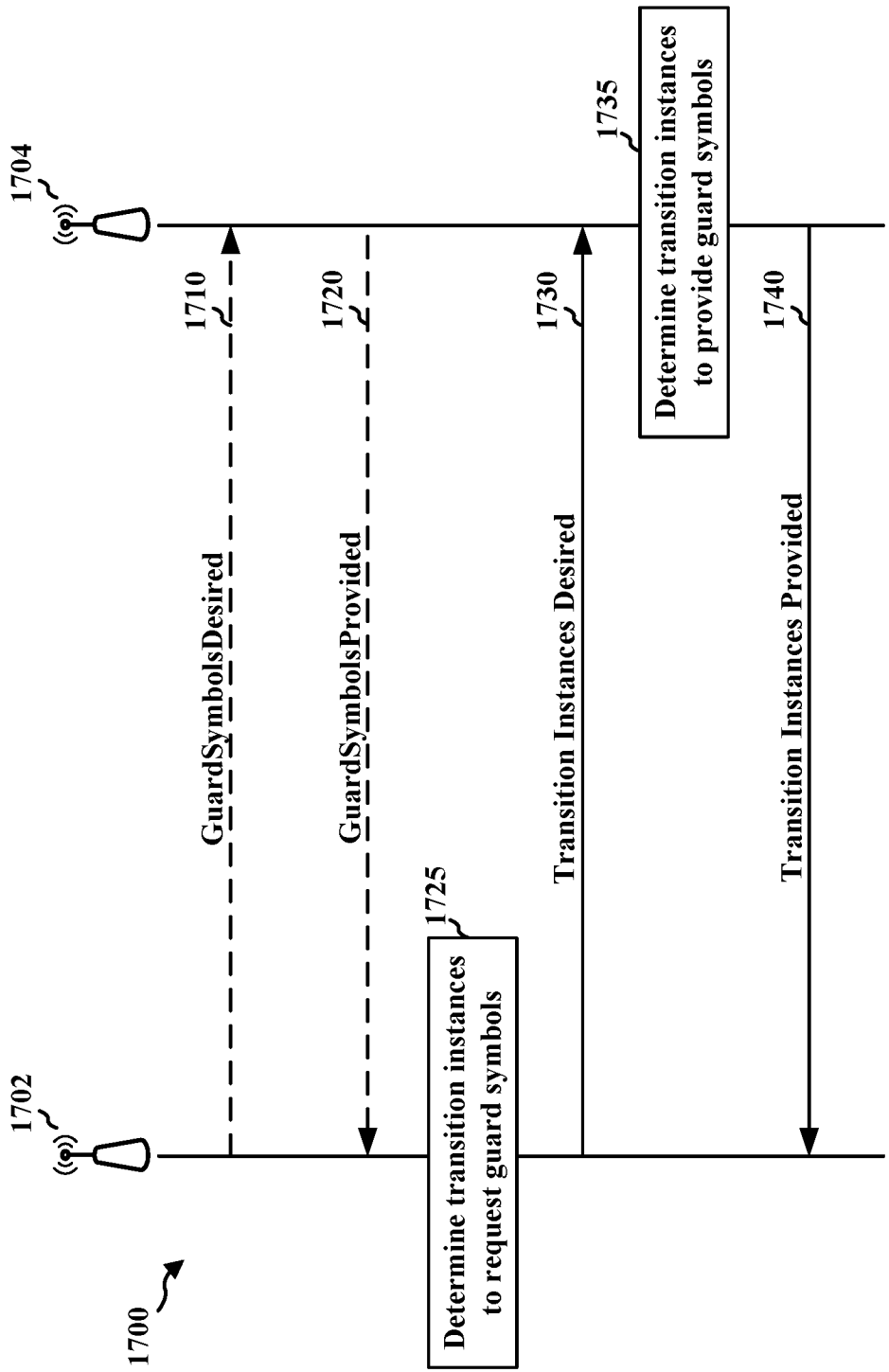
FIG. 17 is a communication diagram illustrating guard symbol signaling and transition instance signaling between a child IAB node and a parent IAB apparatus.

FIG. 17 is a communication diagram 1700 illustrating guard symbol signaling and transition instance signaling between a child IAB node 1702 and a parent IAB apparatus 1704. In some aspects, the child IAB node 1702 and the parent IAB apparatus 1704 may specify which transition instances guard symbols should be provided at or will be provided at.

The child IAB node 1702 may transmit a GuardSymbolsDesired signal 1710 to the parent IAB apparatus 1704 indicating a number of guard symbols for different transition types, and the parent IAB apparatus 1704 may transmit a GuardSymbolsProvided signal 1720 to the child IAB node 1702 indicating a number of guard symbols which the parent IAB apparatus will supply for different transmission types. For example, this may be performed as described above with respect to FIG. 9.

As illustrated at 1725, the child IAB node 1702 may determine transition instances to request guard symbols. The child IAB node 1702 may determine not to request guard symbols for every transition it performs. For example, the child IAB node 1702 may determine that the child IAB node can provide the guard symbols for certain transitions without receiving guard symbols from the parent IAB apparatus, or the child IAB node 1702 may determine that no guard symbols are needed for certain transitions. The guard symbols may not be used for communication, which may reduce resource utilization. If guard symbols are provided by the parent IAB apparatus 1704, then resource utilization for the backhaul link between the parent IAB apparatus 1704 and the child IAB node 1702 (e.g., between the parent DU and child MT) may be reduced. If guard symbols are provided by the child IAB node 1702, the resource utilization for a child link (e.g., between the child DU and a MT of a grandchild IAB apparatus) may be reduced. To balance the resource utilization between the parent backhaul link and the child link, the child IAB node 1702 may request guard symbols from parent node for a subset of transition instances, and may provide the guard symbols for remaining transition instance itself. The child IAB node 1702 may determine that it will request guard symbols from the parent IAB apparatus 1704 for other transition instances.

A parent IAB apparatus 1704 may not know all scheduling information for a child IAB node 1702. For example, the parent IAB apparatus 1704 may know the semi-static resource configuration (e.g., configured as hard, soft, or NA, and TDD) for resources for the child IAB node 1702, but may not know more detailed scheduling information. The parent IAB apparatus 1704 may not be able to identify every transition instance accurately. In some aspects, the child IAB node 1702 may request guard symbols for transition instances based on scheduling information of the child IAB node 1702 (e.g., based on the child IAB node's slot format indication (SFI) or scheduling plan for the resources).

Some transition instances may be ambiguous to the parent IAB apparatus 1704 based on the knowledge available to the parent IAB apparatus 1704. For example, where a symbol adjacent to a transition instance and allocated to the DU of the child IAB node 1702 is configured as flexible, the parent IAB node may not know what transition type the resource instance will have. In some aspects, the request for guard symbols for a transition instance may resolve ambiguities or may include additional information which resolves ambiguities. For example, a request for guard symbols for a transition instance may indicate the transition type of the transition instance. The child IAB node 1702 may determine the transition type of the transition instance based on the child DU's SFI and/or scheduling information.

The child IAB node 1702 may transmit a transition instances desired signal 1730 to the parent IAB apparatus 1704. The transition instances desired signal 1730 may identify a set of transition instances at which the child IAB node 1702 will transition between use of its MT and use of its DU, and which the child IAB node 1702 determined at 1725 to request guard symbols from the parent IAB apparatus 1704.

The transition instances desired signal 1730 may include transition times for the transition instances identified. In some aspects, the transition instances desired signal 1730 may include a bitmap identifying the transition times of the transition instances. In some aspects, the bitmap may include a bit corresponding to each instance of the child IAB node 1702 transitioning between its MT and its DU, and the value of a given bit may indicate whether the child IAB node 1702 is requesting guard symbols for that transition. In some aspects, the bits of the bitmap may correspond to resources (e.g., each bit is one slot or one symbol) and the value of a given bit may indicate whether a transition will occur at that resource for which the child IAB node 1702 requests guard symbols. In some aspects, the transition instances desired symbols may include a set of resource indices identifying resources at which a transition will occur for which the child IAB node 1702 requests guard symbols.

The transition instances desired signal 1730 may also include additional information for each indicated transition instance. In some aspects, the transition instances desired signal 1730 may identify a transition type for identified transition instances. The transition type may be one of the transition Types 1-8 described above with respect to FIG. 8. The child IAB node 1702 may be able to provide a transition type for a transition instance based on information unavailable to the parent IAB apparatus 1704, such as the child IAB node's MAC layer scheduling information, so the child IAB node 1702 may provide the transition type for a transition instance when it would not otherwise be available to the parent IAB apparatus 1704. The parent IAB apparatus 1704 may utilize the transition type to determine whether to provide guard symbols for the transition instance, or to determine how may guard symbols to provide for the transition instance, e.g., as described above with respect to FIG. 9.

In some aspects, the transition instances desired signal 1730 may include a composite transition type for identified transmission instances. A composite transition type may include one or more of the transition Types 1-8 described above with respect to FIG. 8. For example, a composite transition type for a given transition instance may identify both transition Type 2 (transitioning from DL resources on the MT to UL resources on the DU) and transition Type 1 (transitioning from DL resources on the MT to DL resources on the DU). In some aspects, the child IAB node 1702 may request guard symbols for a transition which includes a flexible resource (e.g., allocated to the DU) adjacent to the transition time. The child IAB node 1702 may transmit the transition instances desired signal 1730 to the parent IAB apparatus 1704 before determining whether the flexible resource will be converted to UL or to DL. The transition instances desired signal 1730 may include a composite transition type indicating the transition type that would result if the flexible resource is converted to UL and the transition type that would result if the flexible resource is converted to DL.

The parent IAB apparatus 1704 may utilize the composite transition type to determine whether to provide guard symbols for the transition instance, or to determine how many guard symbols to provide for the transition instance. For example, the parent IAB apparatus 1704 may determine the guard symbols requested value for each transition type identified in the composite transition type (e.g., based on the GuardSymbolsDesired signal 1710), and may select one of the values. In some aspects, the parent IAB apparatus 1704 may select the highest value. In some aspects, the parent IAB apparatus 1704 may select the lowest value.

In some aspects, the transition instances desired signal 1730 may include an index for identified transmission instances. The index may correspond to a predefined or preconfigured set of values for a number of requested guard symbols. The parent IAB apparatus 1704 may utilize the index to determine the guard symbols requested for the transition instance based on the predefined or preconfigured set of values.

In some aspects, the information for a transition included in the transition instances desired signal 1730 may depend on the characteristics of the indicated transition. For example, the information included may be based on a transition type of the transition or on the number of gap symbols requested for the transition type. In some aspects, the transition instances desired signal 1730 may include multiple transition instances desired signals corresponding to different transition types, and the transition instances desired signal for a given transition type may indicate transition instances having the given transition type. In some aspects, the transition instances desired signal 1730 may include multiple transition instances desired signals corresponding to different numbers of guard symbols to be provided for the identified transmission instance.

In some aspects, as illustrated at 1735, the parent IAB apparatus 1704 may determine transition instances to provide guard symbols. The selection criterion may be based on factors including resource utilization of parent backhaul link, reserved resources for cell-specific signals (e.g., the parent IAB apparatus 1704 may not provide guard symbols for a transition instance due to presence of cell-specific signals). In some aspects, the parent IAB apparatus 1704 may determine the transition instances to provide guard symbols based on the transition instances indicated in the transition instances desired signal 1710 by selecting some or all of the indicated transmission instances. In some aspects, the IAB apparatus 1704 may determine the transmission instances to provide guard symbols independently.

The parent IAB apparatus 1704 may transmit a transition instances provided signal 1740 to the child IAB node 1702. The transition instances provided signal 1740 may identify a set of transition instances at which the parent IAB apparatus 1704 will provide guard symbols. The transition instances provided signal 1740 may include a transition time associated with the indicated transition instances. In some aspects, the transition instances provided signal 1740 may also include a number of guard symbols for the identified transition instances identifying the number of guard symbols which the parent IAB apparatus 1704 will provide at the transition instance.

The child IAB node 1702 may receive the transition instances provided signal 1740 and may utilize it to determine how many guard symbols the child IAB node 1702 will provide at each of the identified transition instances. For example, the child IAB node 1702 may compare the number of guards symbols that will be received at a transition instance to the number of guard symbols desired for that transition instance, and my determine to provide the remaining guard symbols.

In some aspects, the transition instances desired signal 1730 and the transition instances provided signal 1740 may be media access control (MAC) control elements (CE). The transition instances desired signal 1730 and the transition instances provided signal 1740 may indicate a periodic pattern for the signals which is applied until a new MAC CE is received.

In some aspects, the transition instances desired signal 1730 and the transition instances provided signal 1740 may include L1 signaling. The child IAB node 1702 may transmit the transition instances desired signal 1730 at an allocated physical resource, and the parent IAB apparatus 1704 may monitor for the transition instances desired signal 1730 on the allocated physical resource. The parent IAB apparatus 1704 may transmit the transition instances provided signal 1740 at an allocated physical resource, and the child IAB node 1702 may monitor for the transition instances provided signal 1740 at the allocated physical resource. If no signal is received, a default value may be assumed (e.g., guard symbols are requested/provided for all transition instances). If received, the transition instances identified in the transition instances desired signal 1730 and/or the transition instances provided signal 1740 may be observed for a set or preconfigured time span.

Figure 18:
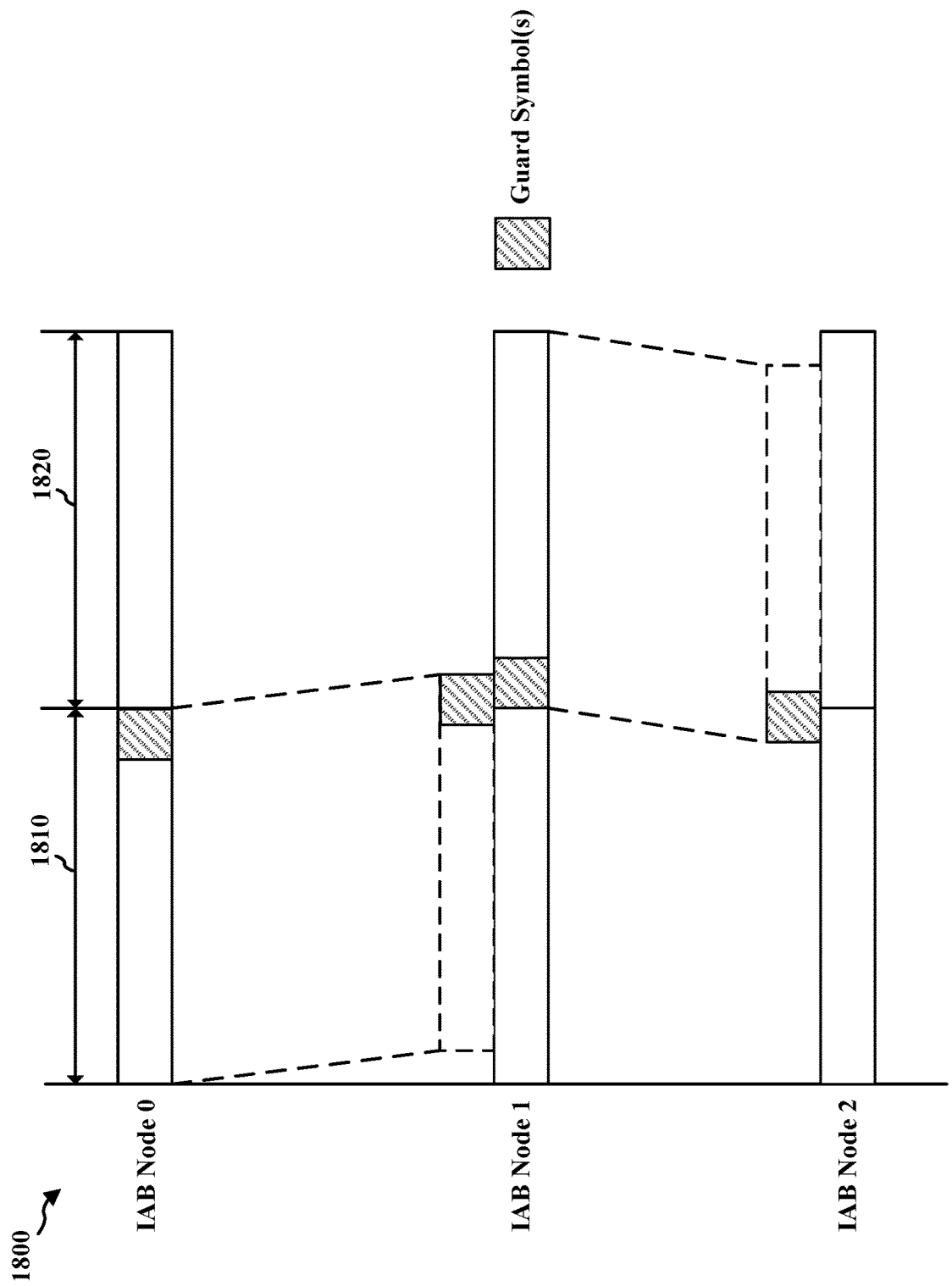
FIG. 18 is a diagram illustrating communication between three IAB nodes.

FIG. 18 is a diagram 1800 illustrating communication between three IAB nodes. IAB node 0 may be a parent node of IAB node 1 and a grandparent node of IAB node 2. IAB node 1 may be a parent node of IAB node 2. IAB node 2 may be a child node of IAB node 1 and a grandchild node of IAB node 0.

Between a first slot 1810 and a second slot 1820, IAB node 1 may transition from use of its MT to use of its DU. As described above, IAB node 0 may provide guard symbols for IAB node 1 at the time of the transition.

Between the first slot 1810 and the second slot 1820, IAB node 2 may transition from use of its DU to use of its MT. As described above, IAB node 1 may provide guard symbols for IAB node 2 at the time of the transition. As IAB node 1 is providing guard symbols at the beginning of the second slot 1820, the guard symbols provided by IAB node 0 at the end of the first slot 1810 may be redundant.

In some aspects, an IAB node may utilize the signaling described above with respect to FIG. 17 to avoid redundant guard symbols in simultaneous multi-hop transitions. For example, in FIG. 18, IAB node 1 may determine that it will provide guard symbols for IAB node 2 at the transition instance between the first slot 1810 and the second slot 1820. Accordingly, when IAB node 1 transmits the transition instances desired message to IAB node 0, it will not indicate that it desires guard symbols from IAB node 0 at the transition instance between the first slot 1810 and the second slot 1820.

Figure 19:
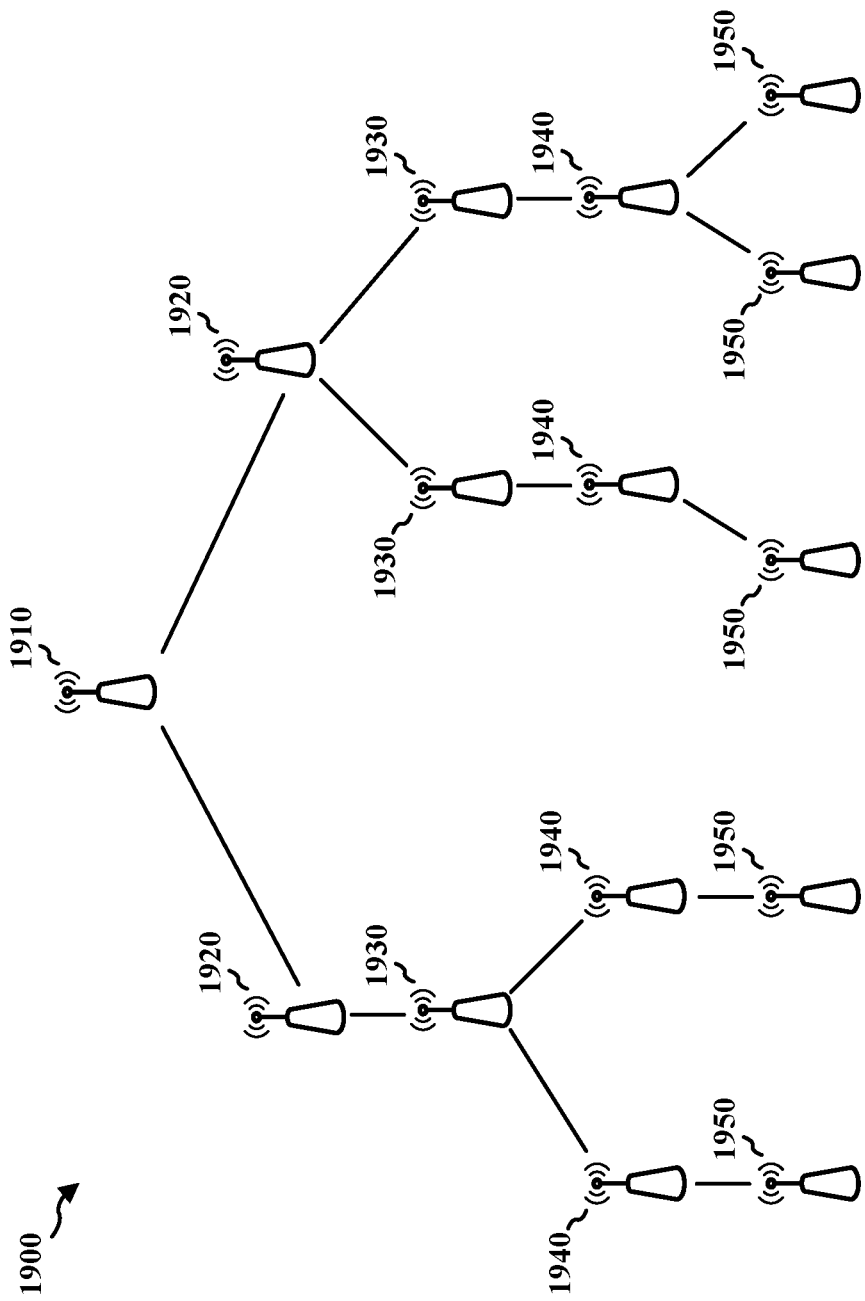
FIG. 19 is a diagram illustrating an IAB network.

FIG. 19 is a diagram 1900 illustrating an IAB network. The IAB network includes an IAB donor 1910. The IAB nodes of the IAB network may be divided into different sets based on their hop count from the IAB donor 1910. The hop count may be the number of IAB nodes, including itself, an IAB node is removed from the IAB donor 1910. A first set of IAB nodes 1920 may include IAB nodes having a hop count of one. A second set of IAB nodes 1930 may include IAB nodes having a hop count of two. A third set of IAB nodes 1940 may include IAB nodes having a hop count of three. A fourth set of IAB nodes 1950 may include IAB nodes having a hop count of four.

The IAB donor 1910 may transmit a configuration message to the IAB nodes of the IAB network. For example, the configuration message may be transmitted to the IAB nodes through the F1 interface. The configuration message may configure whether the IAB node provides guard symbols to its child IAB nodes. Where the configuration message directs the IAB node to provide guard symbols, the IAB node may transmit GuardSymbolsProvided and provide guard symbols as described above. Where the configuration message directs the IAB node not to provide guard symbols, the IAB node may not provide guard symbols at transition instances of its child IAB nodes.

In some aspects, in response to the configuration message directing the IAB node not to provide guard symbols, the IAB node may set all values of GuardSymbolsProvided for the IAB node to zero. When the IAB node transmits GuardSymbolsProvided to its child IAB nodes, it will indicate to the child IAB nodes that the IAB node will not be providing guard symbols for transitions.

In some aspects, in response to the configuration message directing the IAB node not to provide guard symbols, the IAB node may not transmit GuardSymbolsProvided to its child IAB nodes, and the child IAB nodes may be configured to assume zero symbols will be provided when GuardSymbolsProvided is not received.

The IAB donor 1910 may configure the IAB network such that whether an IAB node provides guard symbols at transition instances of its children alternates every hop. In some aspects, the IAB donor 1910 may transmit a configuration message directing the IAB node to provide guard symbols to the IAB nodes with an even hop count (e.g., the second set of IAB nodes 1930 and the fourth set of IAB nodes 1950) and may transmit a configuration message directing the IAB node not to provide guard symbols to the IAB nodes with an odd hop count (e.g., the first set of IAB nodes 1920 and the third set of IAB nodes 1940). In some aspects, the IAB donor 1910 may transmit a configuration message directing the IAB node to provide guard symbols to the IAB nodes with an odd hop count (e.g., the first set of IAB nodes 1920 and the third set of IAB nodes 1940) and may transmit a configuration message directing the IAB node not to provide guard symbols to the IAB nodes with an even hop count (e.g., the second set of IAB nodes 1930 and the fourth set of IAB nodes 1950). Accordingly, if an IAB node is providing guard symbols for a transition of its child IAB node, its parent IAB node will not be providing guard symbols at the transition instance, so redundant guard symbols can be avoided.

Figure 20:
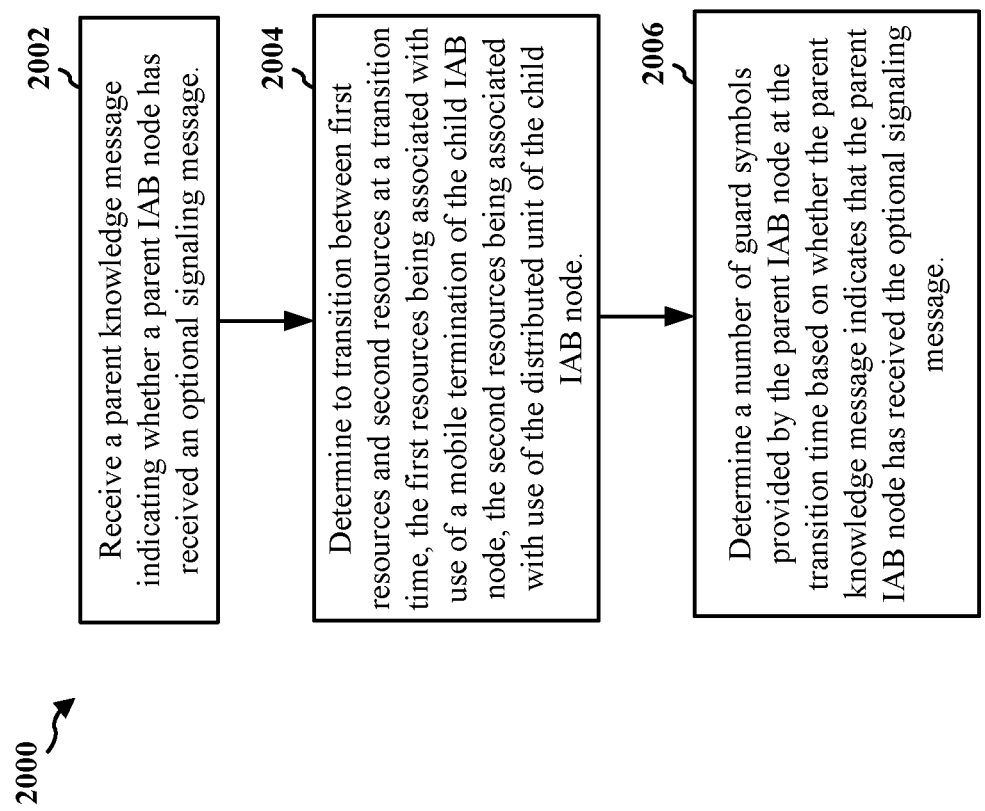
FIG. 20 is a flowchart of a method of wireless communication.

FIG. 20 is a flowchart 2000 of a method of wireless communication. The method may be performed by a child IAB node (e.g., the IAB node 1606).

At 2002, the child IAB node may receive a parent knowledge message, the parent knowledge message indicating whether a parent IAB node of the child IAB node has received an optional signaling message. The optional signaling message may identify a resource configuration of the child IAB node to the parent IAB node or may identify an allocation of cell specific signal of the child IAB node to the parent IAB node. The parent knowledge message may be received from the parent IAB node. The parent knowledge message may be received from a central unit of a IAB donor. The parent knowledge message may identify a selected rule for determination of potential transition instances from a pre-defined list of rules based on the optional signaling message. The parent knowledge message may be carried by a media access control control element (MAC-CE). The MAC-CE may indicate guard symbols provided by the parent node. The parent knowledge message may be carried by a F1-AP message. The parent knowledge message may be carried by a radio resource control (RRC) message.

At 2004, the child IAB node may determine to transition between first resources and second resources at a transition time, the first resources being associated with use of a mobile termination of the child IAB node, the second resources being associated with use of the distributed unit of the child IAB node.

At 2006, the child IAB node may determine a number of guard symbols provided by the parent IAB node at the transition time based on whether the parent knowledge message indicates that the parent IAB node has received the optional signaling message.

In some aspects, the child IAB node may determine a number of guard symbols to provide at the transition time based on the determined number of guard symbols provided by the parent IAB node.

Figure 21:
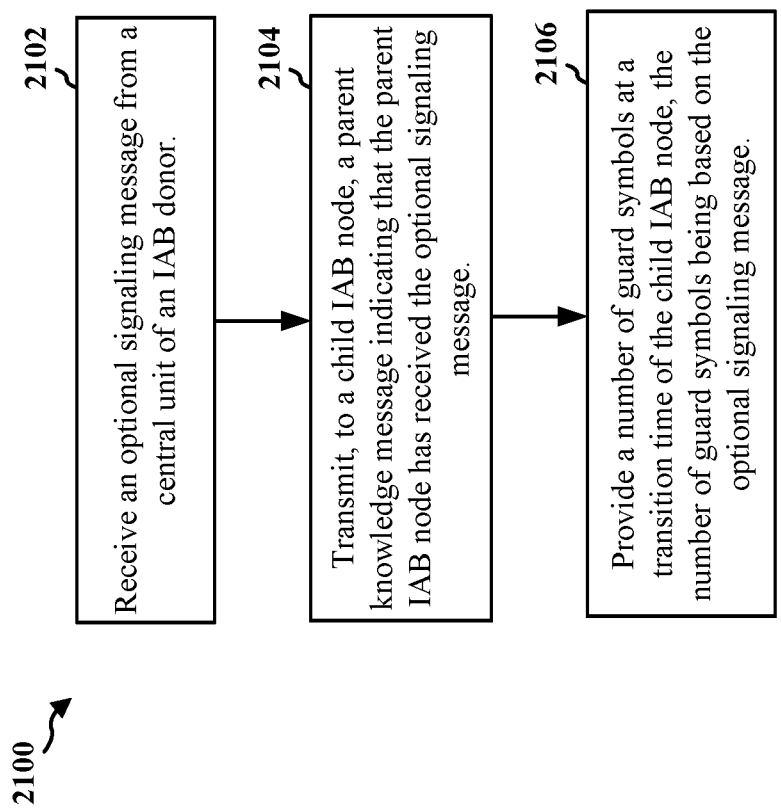
FIG. 21 is a flowchart of a method of wireless communication.

FIG. 21 is a flowchart 2100 of a method of wireless communication. The method may be performed by a parent IAB node (e.g., the IAB node 1604).

At 2102, the parent IAB node may receive an optional signaling message from a central unit of an IAB donor. the optional signaling message may identify a resource configuration of the child IAB node to the parent IAB node or identifies an allocation of cell specific signal of the child IAB node to the parent IAB node.

At 2104, the parent IAB node may transmit, to a child IAB node, a parent knowledge message indicating that the parent IAB node has received the optional signaling message.

At 2106, the parent IAB node may provide a number of guard symbols at a transition time of the child IAB node. The number of guard symbols may be based on the optional signaling message.

Figure 22:
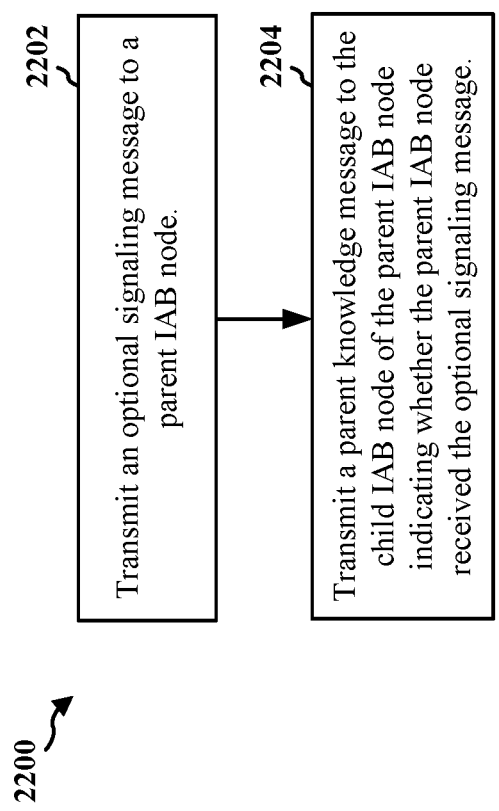
FIG. 22 is a flowchart of a method of wireless communication.

FIG. 22 is a flowchart 2200 of a method of wireless communication. The method may be performed by an IAB donor (e.g., the IAB donor 1602).

At 2202, the IAB donor may transmit an optional signaling message to a parent IAB node. The optional signaling message may identify a resource configuration of the child IAB node to the parent IAB node or may identify an allocation of cell specific signal of the child IAB node to the parent IAB node.

At 2204, the IAB donor may transmit a parent knowledge message to the child IAB node of the parent IAB node, the parent knowledge message indicating whether the parent IAB node received the optional signaling message.

Figure 23:
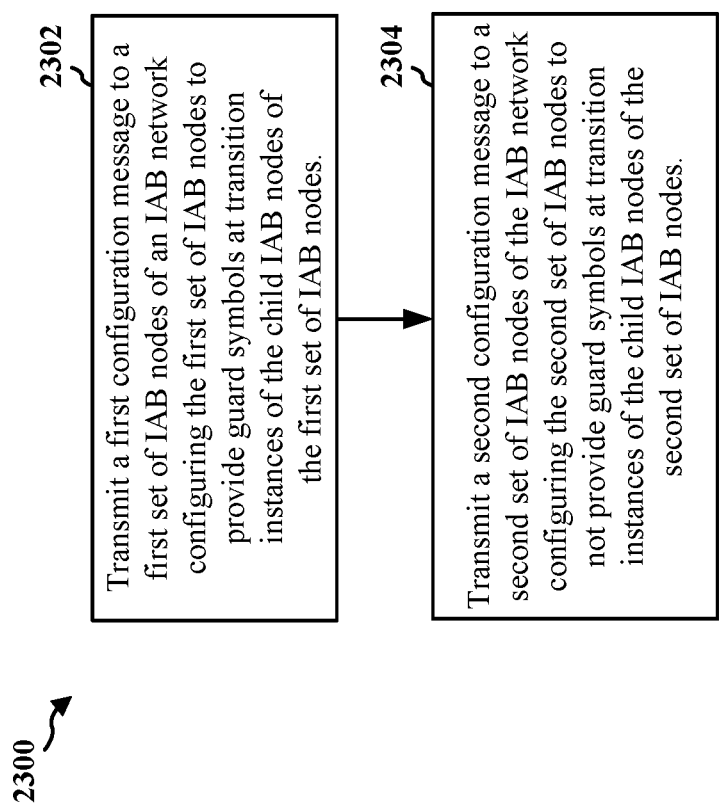
FIG. 23 is a flowchart of a method of wireless communication.

FIG. 23 is a flowchart 2300 of a method of wireless communication. The method may be performed by an IAB donor (e.g., the IAB donor 1910).

At 2302, the IAB donor may transmit a first configuration message to a first set of IAB nodes of an IAB network. The first configuration message may configure the first set of IAB nodes to provide guard symbols at transition instances of the child IAB nodes of the first set of IAB nodes.

At 2304, the IAB donor may transmit a second configuration message to a second set of IAB nodes of the IAB network. The second configuration message may configure the second set of IAB nodes to not provide guard symbols at transition instances of the child IAB nodes of the second set of IAB nodes. In some aspects, the first set of IAB nodes may be IAB nodes with an even hop count from the IAB donor, and the second set of IAB nodes may be IAB nodes with an odd hop count from the IAB donor. In some aspects, the first set of IAB nodes may be IAB nodes with an odd hop count from the IAB donor, and the second set of IAB nodes may be IAB nodes with an event hop count from the IAB donor.

Figure 24:
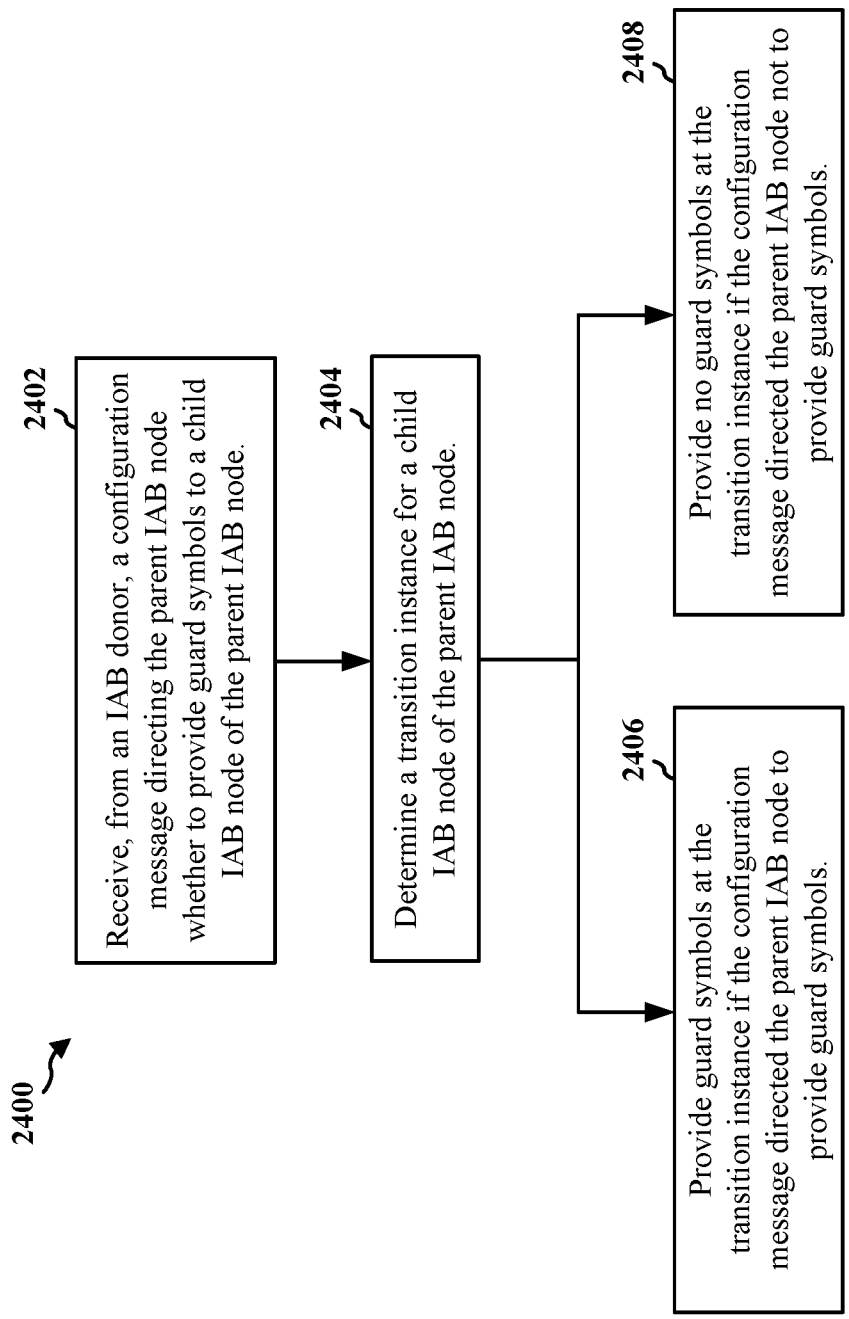
FIG. 24 is a flowchart of a method of wireless communication.

FIG. 24 is a flowchart 2400 of a method of wireless communication. The method may be performed by an IAB node (e.g., an IAB node of the first set of IAB nodes 1920, the second set of IAB nodes 1930, the third set of IAB nodes 1940).

At 2402, the IAB node may receive, from an IAB donor, a configuration message. The configuration message may direct the parent IAB node to provide guard symbols or to not provide guard symbols to a child IAB node of the parent IAB node. In some aspects, the parent IAB node may have an even hop count from the IAB donor. In some aspects, the parent IAB node may have an odd hop count from the IAB donor.

At 2404, the IAB node may determine a transition instance for a child IAB node of the parent IAB node, the transition instance being a transition between use of a mobile terminal of the child IAB node and use of a distributed unit of the child IAB node.

At 2406, the IAB node may provide guard symbols at the transition instance if the configuration message directed the parent IAB node to provide guard symbols.

At 2408, the IAB node may provide no guard symbols at the transition instance if the configuration message directed the parent IAB node not to provide guard symbols.

Figure 25:
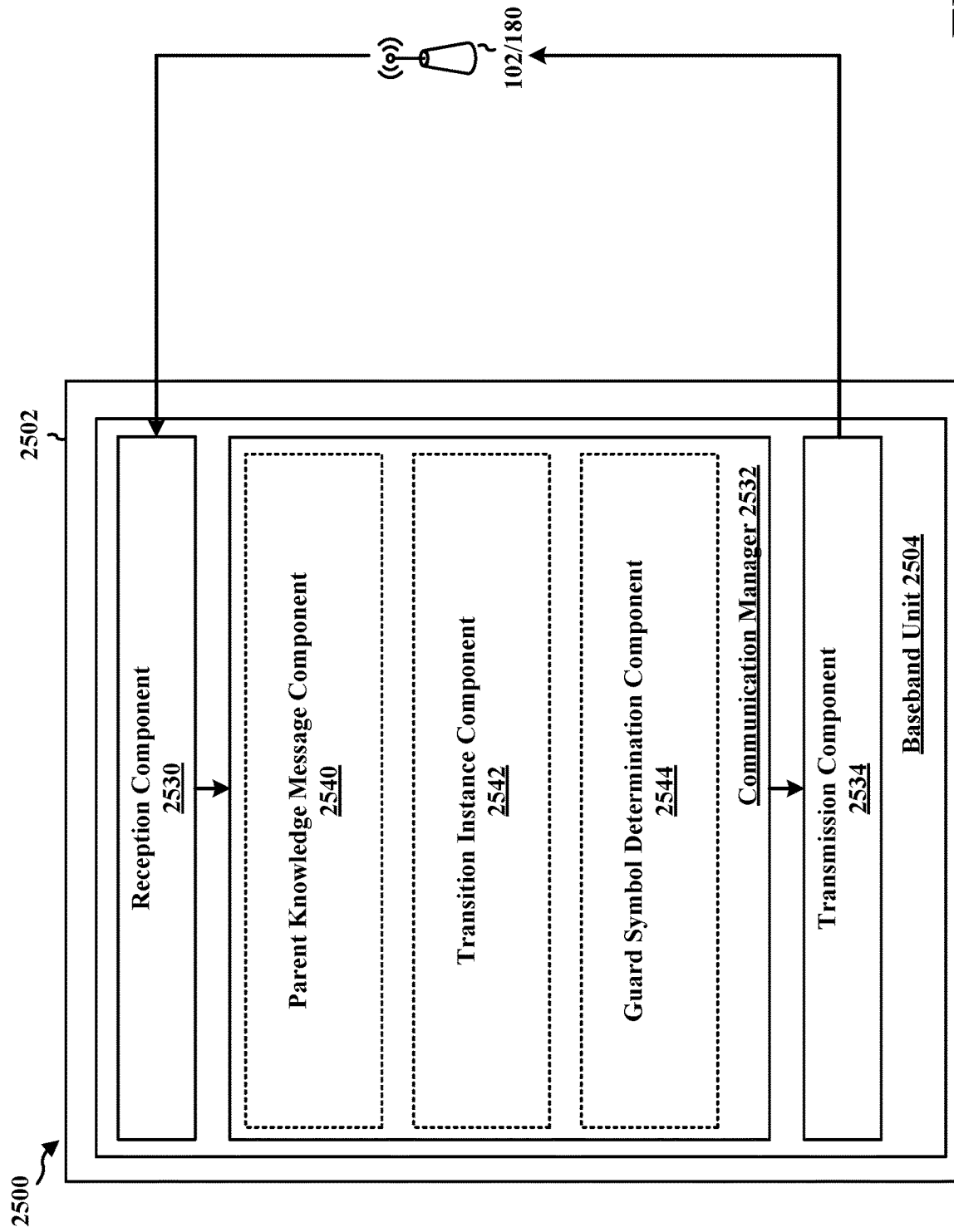
FIG. 25 is a diagram illustrating an example of a hardware implementation for an apparatus.

FIG. 25 is a diagram 2500 illustrating an example of a hardware implementation for an apparatus 2502. The apparatus 2502 may be an IAB apparatus. The apparatus 2502 may be a child IAB node, and may have a parent IAB node 102/180. The apparatus 2502 includes a baseband unit 2504. The baseband unit 2504 may communicate through a cellular RF transceiver with the UE 104. The baseband unit 2504 may include a computer-readable medium/memory. The baseband unit 2504 is responsible for general processing, including the execution of software stored on the computer-readable medium/memory. The software, when executed by the baseband unit 2504, causes the baseband unit 2504 to perform the various functions described supra. The computer-readable medium/memory may also be used for storing data that is manipulated by the baseband unit 2504 when executing software. The baseband unit 2504 further includes a reception component 2530, a communication manager 2532, and a transmission component 2534. The communication manager 2532 includes the one or more illustrated components. The components within the communication manager 2532 may be stored in the computer-readable medium/memory and/or configured as hardware within the baseband unit 2504. The baseband unit 2504 may be a component of the BS 310 and may include the memory 376 and/or at least one of the TX processor 316, the RX processor 370, and the controller/processor 375.

The communication manager 2532 includes a parent knowledge component 2540 that receives a parent knowledge message, the parent knowledge message indicating whether a parent IAB node of the child IAB node has received an optional signaling message, e.g., as described in connection with 2002 of FIG. 20. The communication manager 2532 further includes a transition instance component 2542 that determines to transition between first resources and second resources at a transition time, the first resources being associated with use of a mobile termination of the child IAB node, the second resources being associated with use of the distributed unit of the child IAB node, e.g., as described in connection with 2004 of FIG. 20. The communication manager 2532 further includes a guard symbol determination component 2544 that determines a number of guard symbols provided by the parent IAB node at the transition time based on whether the parent knowledge message indicates that the parent IAB node has received the optional signaling message, e.g., as described in connection with 2006 of FIG. 20.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2502, and in particular the baseband unit 2504, includes means for receiving a parent knowledge message, the parent knowledge message indicating whether a parent IAB node of the child IAB node has received an optional signaling message, means for determining to transition between first resources and second resources at a transition time, the first resources being associated with use of a mobile termination of the child IAB node, the second resources being associated with use of the distributed unit of the child IAB node, and means for determining a number of guard symbols provided by the parent IAB node at the transition time based on whether the parent knowledge message indicates that the parent IAB node has received the optional signaling message. The aforementioned means may be one or more of the aforementioned components of the apparatus 2502 configured to perform the functions recited by the aforementioned means. As described supra, the apparatus 2502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 26:
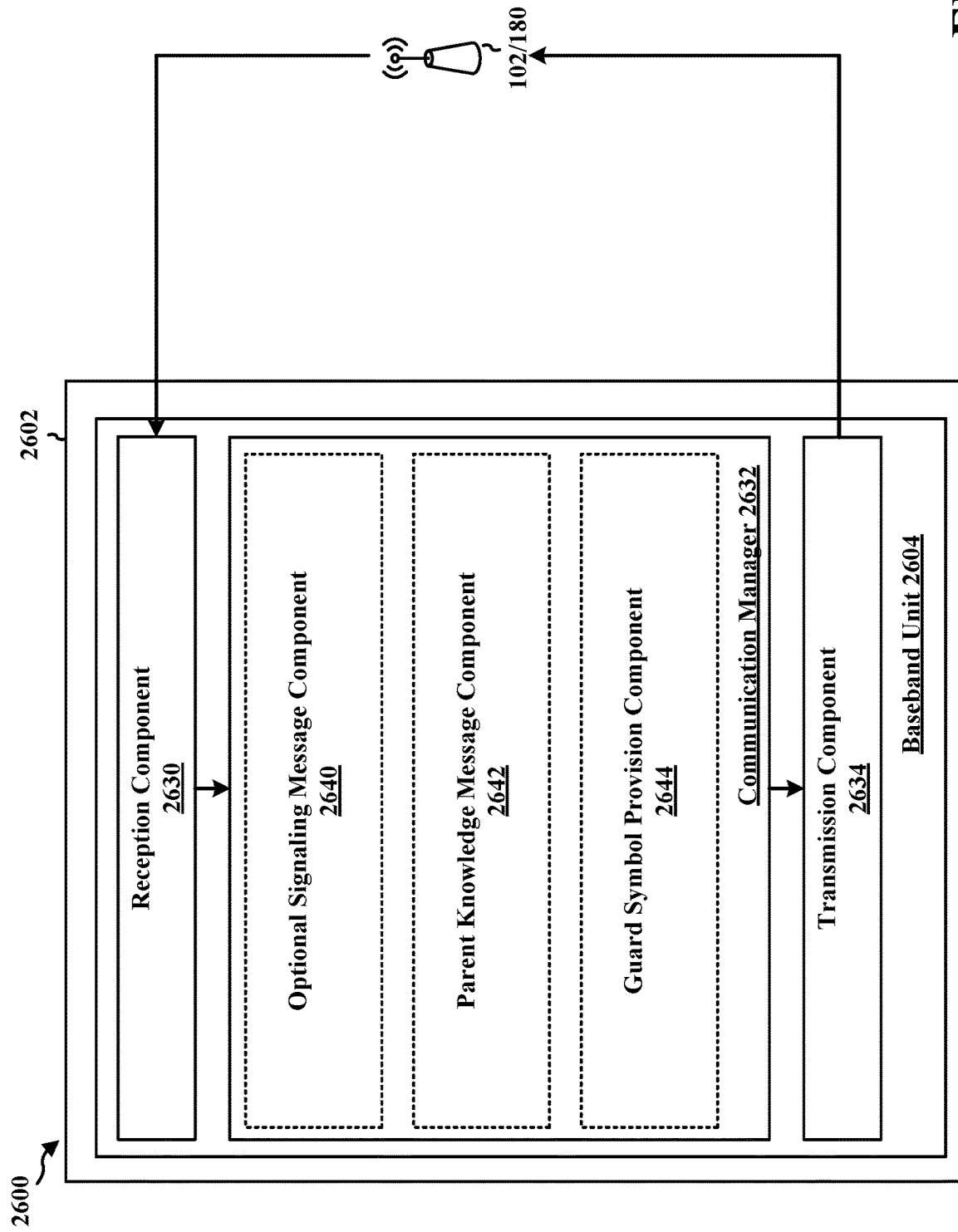
FIG. 26 is a diagram illustrating an example of a hardware implementation for an apparatus.

FIG. 26 is a diagram 2600 illustrating an example of a hardware implementation for an apparatus 2602. The apparatus 2602 may be an IAB apparatus. The apparatus 2602 may be a parent IAB apparatus, and may have a child IAB node 102/180. The apparatus 2602 includes a baseband unit 2604. The baseband unit 2604 may communicate through a cellular RF transceiver with the UE 104. The baseband unit 2604 may include a computer-readable medium/memory. The baseband unit 2604 is responsible for general processing, including the execution of software stored on the computer-readable medium/memory. The software, when executed by the baseband unit 2604, causes the baseband unit 2604 to perform the various functions described supra. The computer-readable medium/memory may also be used for storing data that is manipulated by the baseband unit 2604 when executing software. The baseband unit 2604 further includes a reception component 2630, a communication manager 2632, and a transmission component 2634. The communication manager 2632 includes the one or more illustrated components. The components within the communication manager 2632 may be stored in the computer-readable medium/memory and/or configured as hardware within the baseband unit 2604. The baseband unit 2604 may be a component of the BS 310 and may include the memory 376 and/or at least one of the TX processor 316, the RX processor 370, and the controller/processor 375.

The communication manager 2632 includes an optional signaling message component 2640 that receives an optional signaling message from a central unit of an IAB donor, e.g., as described in connection with 2102 of FIG. 21. The communication manager 2632 further includes a parent knowledge message component 2642 that transmits, to a child IAB node, a parent knowledge message indicating that the parent IAB node has received the optional signaling message, e.g., as described in connection with 2104 of FIG. 21. The communication manager 2632 further includes a guard symbol provision component 2644 that provides a number of guard symbols at a transition time of the child IAB node, the number of guard symbols being based on the optional signaling message, e.g., as described in connection with 2104 of FIG. 21.

The apparatus may include additional components that perform each of the blocks of the algorithm in the aforementioned flowchart of FIG. 21. As such, each block in the aforementioned flowchart of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2602, and in particular the baseband unit 2604, includes means for receiving an optional signaling message from a central unit of an IAB donor, means for transmitting, to a child IAB node, a parent knowledge message indicating that the parent IAB node has received the optional signaling message, and means for providing a number of guard symbols at a transition time of the child IAB node, the number of guard symbols being based on the optional signaling message. The aforementioned means may be one or more of the aforementioned components of the apparatus 2602 configured to perform the functions recited by the aforementioned means. As described supra, the apparatus 2602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 27:
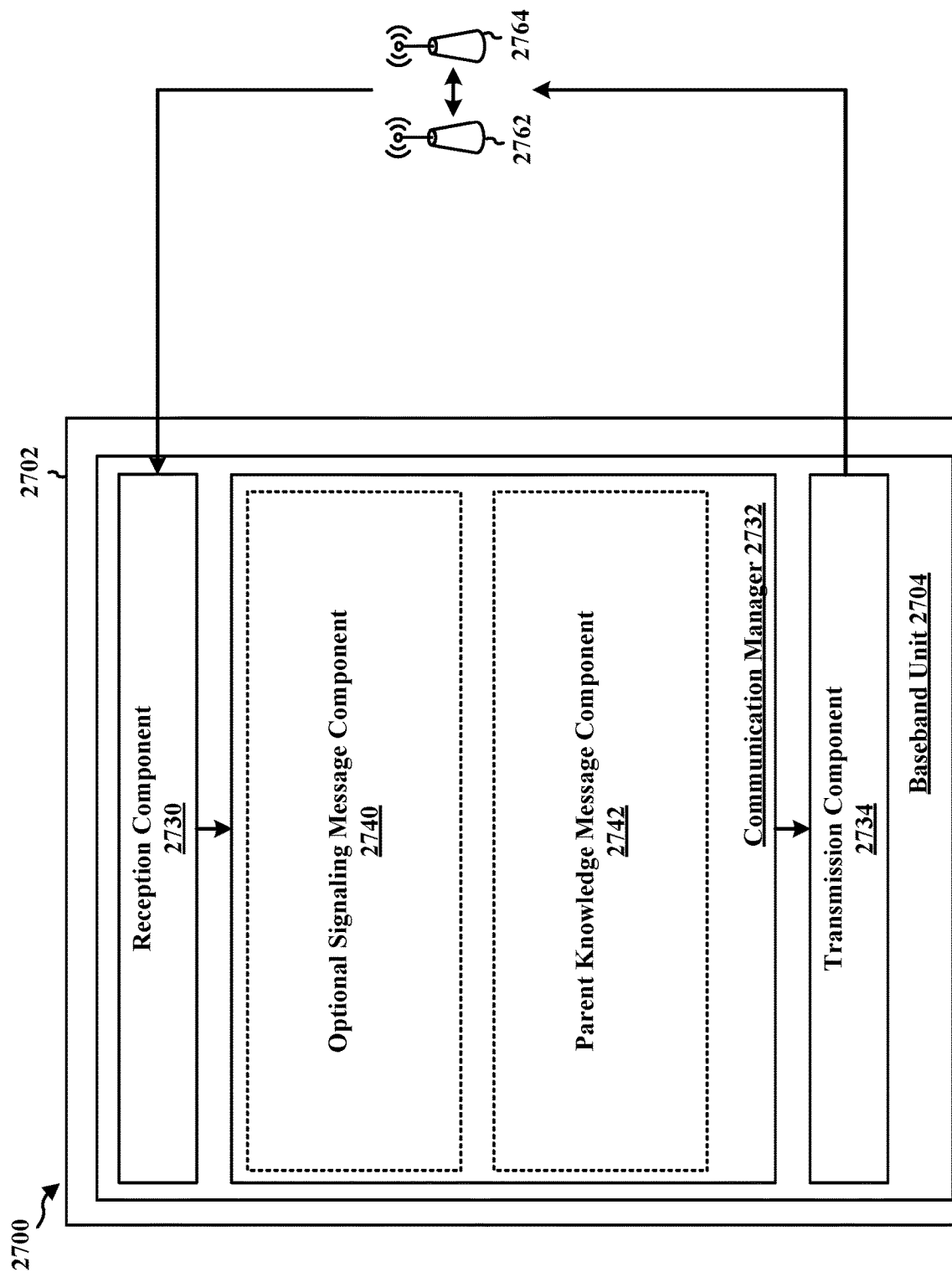
FIG. 27 is a diagram illustrating an example of a hardware implementation for an apparatus.

FIG. 27 is a diagram 2700 illustrating an example of a hardware implementation for an apparatus 2702. The apparatus 2702 may be an IAB donor. The apparatus 2705 may communicate with a network of IAB nodes, including a first IAB node 2762 and a second IAB node 2764, where the first IAB node 2762 may be a parent IAB node to the second IAB node 2764 and the second IAB node 2764 may be a child IAB node to the first IAB node 2762. The apparatus 2702 includes a baseband unit 2704. The baseband unit 2704 may communicate through a cellular RF transceiver with the UE 104. The baseband unit 2704 may include a computer-readable medium/memory. The baseband unit 2704 is responsible for general processing, including the execution of software stored on the computer-readable medium/memory. The software, when executed by the baseband unit 2704, causes the baseband unit 2704 to perform the various functions described supra. The computer-readable medium/memory may also be used for storing data that is manipulated by the baseband unit 2704 when executing software. The baseband unit 2704 further includes a reception component 2730, a communication manager 2732, and a transmission component 2734. The communication manager 2732 includes the one or more illustrated components. The components within the communication manager 2732 may be stored in the computer-readable medium/memory and/or configured as hardware within the baseband unit 2704. The baseband unit 2704 may be a component of the BS 310 and may include the memory 376 and/or at least one of the TX processor 316, the RX processor 370, and the controller/processor 375.

The communication manager 2732 includes an optional signaling message component 2740 that transmits an optional signaling message to a parent IAB node (e.g., the first IAB node 2762), e.g., as described in connection with 2202 of FIG. 22. The communication manager 2732 further includes a parent knowledge message component 2742 that transmits a parent knowledge message to the child IAB node (e.g., 2764) of the parent IAB node, the parent knowledge message indicating whether the parent IAB node received the optional signaling message, e.g., as described in connection with 2204 of FIG. 22.

The apparatus may include additional components that perform each of the blocks of the algorithm in the aforementioned flowchart of FIG. 22. As such, each block in the aforementioned flowchart of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2702, and in particular the baseband unit 2704, includes means for transmitting an optional signaling message to a parent IAB node, and means for transmitting a parent knowledge message to the child IAB node of the parent IAB node, the parent knowledge message indicating whether the parent IAB node received the optional signaling message. The aforementioned means may be one or more of the aforementioned components of the apparatus 2702 configured to perform the functions recited by the aforementioned means. As described supra, the apparatus 2702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 28:
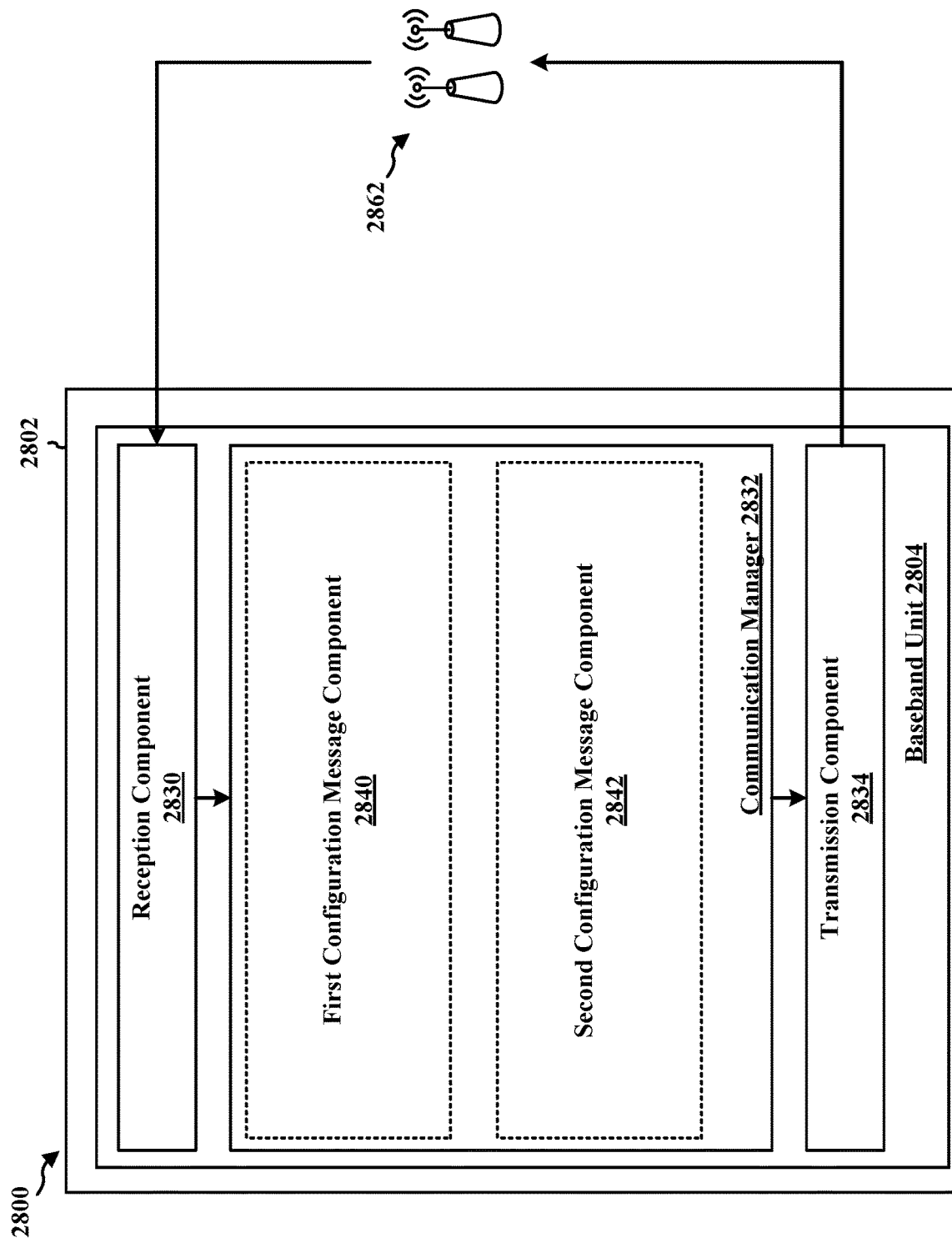
FIG. 28 is a diagram illustrating an example of a hardware implementation for an apparatus.

FIG. 28 is a diagram 2800 illustrating an example of a hardware implementation for an apparatus 2802. The apparatus 2802 may be an IAB donor. The apparatus 2705 may communicate with a network of IAB nodes 2862. The apparatus 2802 includes a baseband unit 2804. The baseband unit 2804 may communicate through a cellular RF transceiver with the UE 104. The baseband unit 2804 may include a computer-readable medium/memory. The baseband unit 2804 is responsible for general processing, including the execution of software stored on the computer-readable medium/memory. The software, when executed by the baseband unit 2804, causes the baseband unit 2804 to perform the various functions described supra. The computer-readable medium/memory may also be used for storing data that is manipulated by the baseband unit 2804 when executing software. The baseband unit 2804 further includes a reception component 2830, a communication manager 2832, and a transmission component 2834. The communication manager 2832 includes the one or more illustrated components. The components within the communication manager 2832 may be stored in the computer-readable medium/memory and/or configured as hardware within the baseband unit 2804. The baseband unit 2804 may be a component of the BS 310 and may include the memory 376 and/or at least one of the TX processor 316, the RX processor 370, and the controller/processor 375.

The communication manager 2832 includes a first configuration message component 2840 that transmits a first configuration message to a first set of IAB nodes of an IAB network, the first configuration message configuring the first set of IAB nodes to provide guard symbols at transition instances of the child IAB nodes of the first set of IAB nodes, e.g., as described in connection with 2302 of FIG. 23. The communication manager 2832 further includes a second configuration message component 2842 that transmits a second configuration message to a second set of IAB nodes of the IAB network, the second configuration message configuring the second set of IAB nodes to not provide guard symbols at transition instances of the child IAB nodes of the second set of IAB nodes, e.g., as described in connection with 2304 of FIG. 23.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2802, and in particular the baseband unit 2804, includes means for transmitting a first configuration message to a first set of IAB nodes of an IAB network, the first configuration message configuring the first set of IAB nodes to provide guard symbols at transition instances of the child IAB nodes of the first set of IAB nodes, and means for transmitting a second configuration message to a second set of IAB nodes of the IAB network, the second configuration message configuring the second set of IAB nodes to not provide guard symbols at transition instances of the child IAB nodes of the second set of IAB nodes. The aforementioned means may be one or more of the aforementioned components of the apparatus 2802 configured to perform the functions recited by the aforementioned means. As described supra, the apparatus 2802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 29:
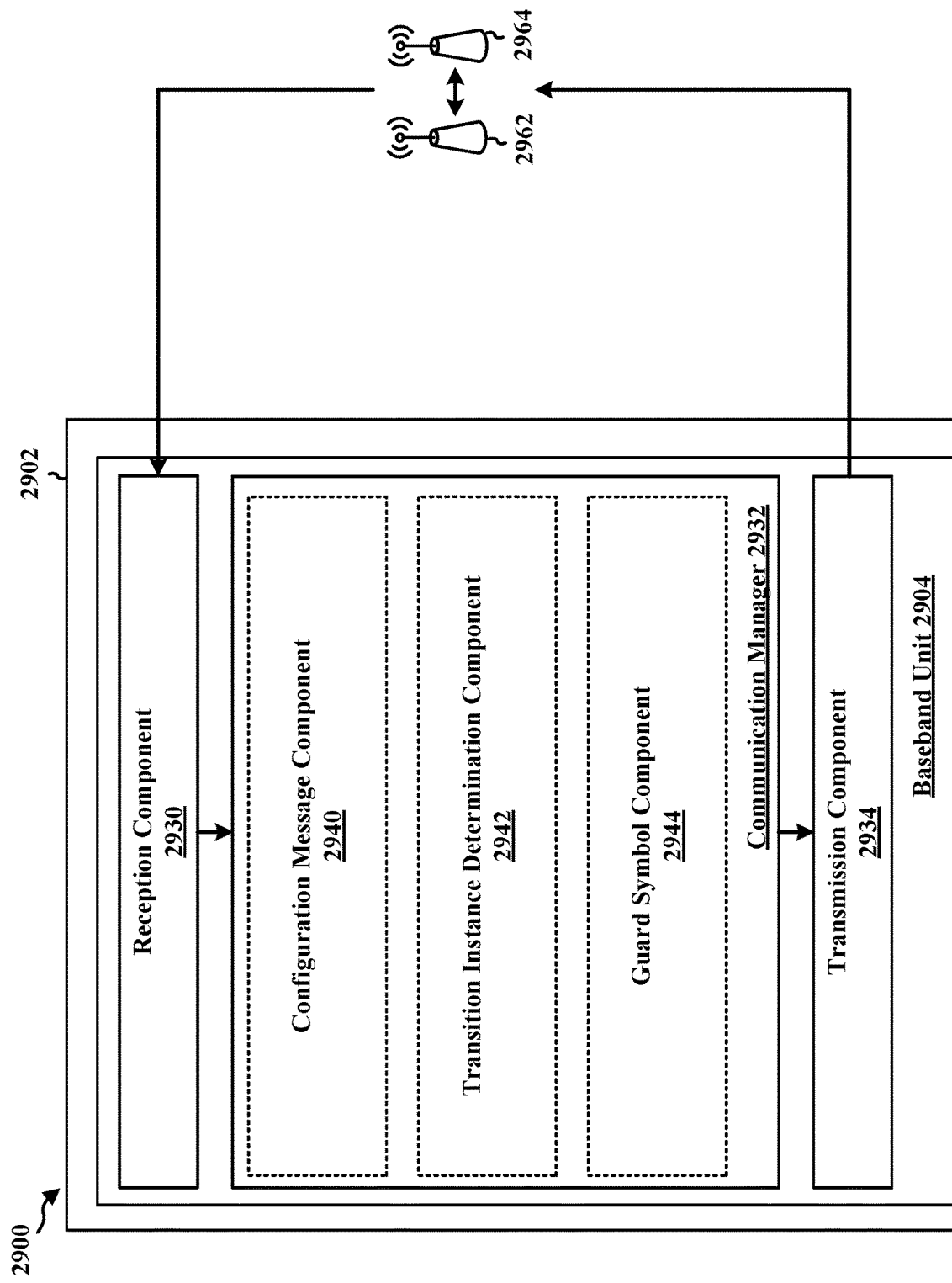
FIG. 29 is a diagram illustrating an example of a hardware implementation for an apparatus.

FIG. 29 is a diagram 2900 illustrating an example of a hardware implementation for an apparatus 2902. The apparatus 2902 may be an IAB node. The apparatus 2902 may have an child IAB node 2964 and may be included in an IAB network with an IAB donor 2962. The apparatus 2902 includes a baseband unit 2904. The baseband unit 2904 may communicate through a cellular RF transceiver with the UE 104. The baseband unit 2904 may include a computer-readable medium/memory. The baseband unit 2904 is responsible for general processing, including the execution of software stored on the computer-readable medium/memory. The software, when executed by the baseband unit 2904, causes the baseband unit 2904 to perform the various functions described supra. The computer-readable medium/memory may also be used for storing data that is manipulated by the baseband unit 2904 when executing software. The baseband unit 2904 further includes a reception component 2930, a communication manager 2932, and a transmission component 2934. The communication manager 2932 includes the one or more illustrated components. The components within the communication manager 2932 may be stored in the computer-readable medium/memory and/or configured as hardware within the baseband unit 2904. The baseband unit 2904 may be a component of the BS 310 and may include the memory 376 and/or at least one of the TX processor 316, the RX processor 370, and the controller/processor 375.

The communication manager 2932 includes a configuration message component 2940 that receives, from an IAB donor, a configuration message, the configuration message directing the parent IAB node whether to provide guard symbols to a child IAB node of the parent IAB node, e.g., as described in connection with 2402 of FIG. 24. The communication manager 2932 further includes a transition instance determination component 2942 that determines a transition instance for a child IAB node of the parent IAB node, the transition instance being a transition between use of a mobile terminal of the child IAB node and use of a distributed unit of the child IAB node, e.g., as described in connection with 2404 of FIG. 24. The communication manager 2932 further includes a guard symbol component 2944 that provides guard symbols at the transition instance if the configuration message directed the parent IAB node to provide guard symbols, and provides no guard symbols at the transition instance if the configuration message directed the parent IAB node not to provide guard symbols, e.g., as described in connection with 2406 and 2408 of FIG. 24.

The apparatus may include additional components that perform each of the blocks of the algorithm in the aforementioned flowchart of FIG. 24. As such, each block in the aforementioned flowchart of FIG. 24 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2902, and in particular the baseband unit 2904, includes means for receiving, from an IAB donor, a configuration message, the configuration message directing the parent IAB node whether to provide guard symbols to a child IAB node of the parent IAB node; means for determining a transition instance for a child IAB node of the parent IAB node, the transition instance being a transition between use of a mobile terminal of the child IAB node and use of a distributed unit of the child IAB node; means for providing guard symbols at the transition instance if the configuration message directed the parent IAB node to provide guard symbols; and means for providing no guard symbols at the transition instance if the configuration message directed the parent IAB node not to provide guard symbols. The aforementioned means may be one or more of the aforementioned components of the apparatus 2902 configured to perform the functions recited by the aforementioned means. As described supra, the apparatus 2902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Implementation examples are described in the following numbered clauses. The following examples are illustrative only and may be combined with aspects of other embodiments or teachings described herein, without limitation.

1. A method of wireless communication at a child integrated access and backhaul (IAB) node, comprising: receiving a parent knowledge message, the parent knowledge message indicating whether a parent IAB node of the child IAB node has received an optional signaling message; determining to transition between first resources and second resources at a transition time, the first resources being associated with use of a mobile termination of the child IAB node, the second resources being associated with use of a distributed unit of the child IAB node; and determining a number of guard symbols provided by the parent IAB node at the transition time based on whether the parent knowledge message indicates that the parent IAB node has received the optional signaling message.

2. The method of clause 1, wherein the parent knowledge message identifies a selected rule for determination of potential transition instances from a pre-defined list of rules based on the optional signaling message.

3. The method of any of clauses 1-2, wherein the optional signaling message identifies a resource configuration of the child IAB node to the parent IAB node or identifies an allocation of cell specific signal of the child IAB node to the parent IAB node.

4. The method of any of clauses 1-3, wherein the parent knowledge message is received from the parent IAB node.

5. The method of any of clauses 1-4, wherein the parent knowledge message is carried by a media access control control element (MAC-CE).

6. The method of any of clauses 1-5, wherein the MAC-CE indicates guard symbols provided by the parent node.

7. The method of any of clauses 1-3, wherein the parent knowledge message is received from a central unit of a IAB donor.

8. The method of any of clauses 1-3 and 7, wherein the parent knowledge message is carried by a F1-AP message.

9. The method of any of clauses 1-3 and 7, wherein the parent knowledge message is carried by a radio resource control (RRC) message.

10. The method of any of clauses 1-9, further comprising providing a number of guard symbols at the transition time, the number of guard symbols being based on the determined number of guard symbols provided by the parent IAB node.

11. An apparatus for wireless communication at a child integrated access and backhaul (IAB) node, comprising: means for receiving a parent knowledge message, the parent knowledge message indicating whether a parent IAB node of the child IAB node has received an optional signaling message; means for determining to transition between first resources and second resources at a transition time, the first resources being associated with use of a mobile termination of the child IAB node, the second resources being associated with use of a distributed unit of the child IAB node; and means for determining a number of guard symbols provided by the parent IAB node at the transition time based on whether the parent knowledge message indicates that the parent IAB node has received the optional signaling message.

12. An apparatus for wireless communication at a child integrated access and backhaul (IAB) node, comprising: a memory; and at least one processor coupled to the memory and configured to: receive a parent knowledge message, the parent knowledge message indicating whether a parent IAB node of the child IAB node has received an optional signaling message; determine to transition between first resources and second resources at a transition time, the first resources being associated with use of a mobile termination of the child IAB node, the second resources being associated with use of a distributed unit of the child IAB node; and determine a number of guard symbols provided by the parent IAB node at the transition time based on whether the parent knowledge message indicates that the parent IAB node has received the optional signaling message.

13. The apparatus of any of clauses 12, wherein the parent knowledge message identifies a selected rule for determination of potential transition instances from a pre-defined list of rules based on the optional signaling message.

14. The apparatus of any of clauses 12-13, wherein the optional signaling message identifies a resource configuration of the child IAB node to the parent IAB node or identifies an allocation of cell specific signal of the child IAB node to the parent IAB node.

15. The apparatus of any of clauses 12-14, wherein the parent knowledge message is received from the parent IAB node.

16. The apparatus of any of clauses 12-15, wherein the parent knowledge message is carried by a media access control control element (MAC-CE).

17. The apparatus of any of clauses 12-16, wherein the MAC-CE indicates guard symbols provided by the parent node.

18. The apparatus of any of clauses 12-14, wherein the parent knowledge message is received from a central unit of a IAB donor.

19. The apparatus of any of clauses 12-14 and 18, wherein the parent knowledge message is carried by a F1-AP message.

20. The apparatus of any of clauses 12-14 and 18, wherein the parent knowledge message is carried by a radio resource control (RRC) message.

21. The apparatus of any of clauses 12-20, wherein the at least one processor is further configured to provide a number of guard symbols at the transition time, the number of guard symbols being based on the determined number of guard symbols provided by the parent IAB node.

22. A non-transitory computer-readable medium storing computer executable code for wireless communication at a user equipment, wherein the code when executed by a processor causes the processor to perform the method of any of clauses 1-10.

23. A method of wireless communication at a parent integrated access and backhaul (IAB) node, comprising: receiving an optional signaling message from a central unit of an IAB donor; transmitting, to a child IAB node, a parent knowledge message indicating that the parent IAB node has received the optional signaling message; and providing a number of guard symbols at a transition time of the child IAB node, the number of guard symbols being based on the optional signaling message.

24. The method of clause 23, wherein the optional signaling message identifies a resource configuration of the child IAB node to the parent IAB node or identifies an allocation of cell specific signal of the child IAB node to the parent IAB node.

25. An apparatus for wireless communication at a parent integrated access and backhaul (IAB) node, comprising: means for receiving an optional signaling message from a central unit of an IAB donor; means for transmitting, to a child IAB node, a parent knowledge message indicating that the parent IAB node has received the optional signaling message; and means for providing a number of guard symbols at a transition time of the child IAB node, the number of guard symbols being based on the optional signaling message.

26. An apparatus for wireless communication at a parent integrated access and backhaul (IAB) node, comprising: a memory; and at least one processor coupled to the memory and configured to: receive an optional signaling message from a central unit of an IAB donor; transmit, to a child IAB node, a parent knowledge message indicating that the parent IAB node has received the optional signaling message; and provide a number of guard symbols at a transition time of the child IAB node, the number of guard symbols being based on the optional signaling message.

27. The apparatus of clause 26, wherein the optional signaling message identifies a resource configuration of the child IAB node to the parent IAB node or identifies an allocation of cell specific signal of the child IAB node to the parent IAB node.

28. A non-transitory computer-readable medium storing computer executable code for wireless communication at a user equipment, wherein the code when executed by a processor causes the processor to perform the method of any of clauses 23-24.

29. A method of wireless communication at an integrated access and backhaul (IAB) donor, comprising: transmitting an optional signaling message to a parent IAB node; and transmitting a parent knowledge message to a child IAB node of the parent IAB node, the parent knowledge message indicating whether the parent IAB node received the optional signaling message.

30. The method of clause 29, wherein the optional signaling message identifies a resource configuration of the child IAB node to the parent IAB node or identifies an allocation of cell specific signal of the child IAB node to the parent IAB node.

31. An apparatus for wireless communication at an integrated access and backhaul (IAB) donor, comprising: means for transmitting an optional signaling message to a parent IAB node; and means for transmitting a parent knowledge message to a child IAB node of the parent IAB node, the parent knowledge message indicating whether the parent IAB node received the optional signaling message.

32. An apparatus for wireless communication at an integrated access and backhaul (IAB) donor, comprising: a memory; and at least one processor coupled to the memory and configured to: transmit an optional signaling message to a parent IAB node; and transmit a parent knowledge message to a child IAB node of the parent IAB node, the parent knowledge message indicating whether the parent IAB node received the optional signaling message.

33. The apparatus of clause 32, wherein the optional signaling message identifies a resource configuration of the child IAB node to the parent IAB node or identifies an allocation of cell specific signal of the child IAB node to the parent IAB node.

34. A non-transitory computer-readable medium storing computer executable code for wireless communication at a user equipment, wherein the code when executed by a processor causes the processor to perform the method of any of clauses 29-30.

35. A method of wireless communication at an integrated access and backhaul (IAB) donor, comprising: transmitting a first configuration message to a first set of IAB nodes of an IAB network, the first configuration message configuring the first set of IAB nodes to provide guard symbols at transition instances of child IAB nodes of the first set of IAB nodes; and transmitting a second configuration message to a second set of IAB nodes of the IAB network, the second configuration message configuring the second set of IAB nodes to not provide guard symbols at transition instances of the child IAB nodes of the second set of IAB nodes.

36. The method of clause 35, wherein the first set of IAB nodes are IAB nodes with an even hop count from the IAB donor, and wherein the second set of IAB nodes are IAB nodes with an odd hop count from the IAB donor.

37. The method of any of clauses 35-36, wherein the first set of IAB nodes are IAB nodes with an odd hop count from the IAB donor, and wherein the second set of IAB nodes are IAB nodes with an event hop count from the IAB donor.

38. An apparatus for wireless communication at an integrated access and backhaul (IAB) donor, comprising: means for transmitting a first configuration message to a first set of IAB nodes of an IAB network, the first configuration message configuring the first set of IAB nodes to provide guard symbols at transition instances of child IAB nodes of the first set of IAB nodes; and means for transmitting a second configuration message to a second set of IAB nodes of the IAB network, the second configuration message configuring the second set of IAB nodes to not provide guard symbols at transition instances of the child IAB nodes of the second set of IAB nodes.

39. An apparatus for wireless communication at an integrated access and backhaul (IAB) donor, comprising: a memory; and at least one processor coupled to the memory and configured to: transmit a first configuration message to a first set of IAB nodes of an IAB network, the first configuration message configuring the first set of IAB nodes to provide guard symbols at transition instances of child IAB nodes of the first set of IAB nodes; and transmit a second configuration message to a second set of IAB nodes of the IAB network, the second configuration message configuring the second set of IAB nodes to not provide guard symbols at transition instances of the child IAB nodes of the second set of IAB nodes.

40. The apparatus of clause 39, wherein the first set of IAB nodes are IAB nodes with an even hop count from the IAB donor, and wherein the second set of IAB nodes are IAB nodes with an odd hop count from the IAB donor.

41. The apparatus of any of clauses 39-40, wherein the first set of IAB nodes are IAB nodes with an odd hop count from the IAB donor, and wherein the second set of IAB nodes are IAB nodes with an event hop count from the IAB donor. 42. A non-transitory computer-readable medium storing computer executable code for wireless communication at a user equipment, wherein the code when executed by a processor causes the processor to perform the method of any of clauses 35-37.

43. A method of wireless communication at a parent integrated access and backhaul (IAB) node, comprising: receiving, from an IAB donor, a configuration message, the configuration message directing the parent IAB node whether to provide guard symbols to a child IAB node of the parent IAB node; determining a transition instance for a child IAB node of the parent IAB node, the transition instance being a transition between use of a mobile terminal of the child IAB node and use of a distributed unit of the child IAB node; providing guard symbols at the transition instance if the configuration message directed the parent IAB node to provide guard symbols; and providing no guard symbols at the transition instance if the configuration message directed the parent IAB node not to provide guard symbols.

44. The method of clause 43, wherein the parent IAB node has an even hop count from the IAB donor.

45. The method of any of clauses 43-44, wherein the parent IAB node has an odd hop count from the IAB donor.

46. An apparatus for wireless communication at a parent integrated access and backhaul (IAB) node, comprising: means for receiving, from an IAB donor, a configuration message, the configuration message directing the parent IAB node whether to provide guard symbols to a child IAB node of the parent IAB node; means for determining a transition instance for a child IAB node of the parent IAB node, the transition instance being a transition between use of a mobile terminal of the child IAB node and use of a distributed unit of the child IAB node; means for providing guard symbols at the transition instance if the configuration message directed the parent IAB node to provide guard symbols; and means for providing no guard symbols at the transition instance if the configuration message directed the parent IAB node not to provide guard symbols.

47. An apparatus for wireless communication at a parent integrated access and backhaul (IAB) node, comprising: a memory; and at least one processor coupled to the memory and configured to: receive, from an IAB donor, a configuration message, the configuration message directing the parent IAB node whether to provide guard symbols to a child IAB node of the parent IAB node; determine a transition instance for a child IAB node of the parent IAB node, the transition instance being a transition between use of a mobile terminal of the child IAB node and use of a distributed unit of the child IAB node; provide guard symbols at the transition instance if the configuration message directed the parent IAB node to provide guard symbols; and provide no guard symbols at the transition instance if the configuration message directed the parent IAB node not to provide guard symbols.

48. The apparatus of clause 47, wherein the parent IAB node has an even hop count from the IAB donor.

49. The apparatus of any of clauses 47-48, wherein the parent IAB node has an odd hop count from the IAB donor.

50. A non-transitory computer-readable medium storing computer executable code for wireless communication at a user equipment, wherein the code when executed by a processor causes the processor to perform the method of any of clauses 43-45.

51. The method of clause 23, wherein the parent knowledge message is carried by a media access control control element (MAC-CE).

52. The method of any of clauses 23 and 51, wherein the MAC-CE indicates guard symbols provided by the parent node.

53. The method of any of clauses 23 and 51-52, wherein the parent knowledge message identifies a selected rule for determination of potential transition instances from a pre-defined list of rules based on the optional signaling message.

54. The apparatus of clause 25, wherein the parent knowledge message is carried by a media access control control element (MAC-CE).

55. The apparatus of any of clauses 25 and 54, wherein the MAC-CE indicates guard symbols provided by the parent node.

56. The apparatus of any of clauses 25 and 54-55, wherein the parent knowledge message identifies a selected rule for determination of potential transition instances from a pre-defined list of rules based on the optional signaling message.

What is claimed is:

1. A method of wireless communication at a child integrated access and backhaul (IAB) node, comprising:
receiving a parent knowledge message, the parent knowledge message indicating whether a parent IAB node of the child IAB node has received an optional signaling message;
performing a transition between first resources and second resources at a transition time, the first resources being associated with use of a mobile termination of the child IAB node, the second resources being associated with use of a distributed unit of the child IAB node; and
wherein a number of guard symbols provided by the parent IAB node at the transition time is based on whether the parent knowledge message indicates that the parent IAB node has received the optional signaling message.

2. The method of claim 1, wherein the parent knowledge message identifies a selected rule for determination of potential transition instances from a pre-defined list of rules based on the optional signaling message.

3. The method of claim 1, wherein the optional signaling message identifies a resource configuration of the child IAB node to the parent IAB node or identifies an allocation of cell specific signal of the child IAB node to the parent IAB node.

4. The method of claim 1, wherein the parent knowledge message is received from the parent IAB node.

5. The method of claim 4, wherein the parent knowledge message is carried by a media access control control element (MAC-CE).

6. The method of claim 5, wherein the MAC-CE indicates guard symbols provided by the parent node.

7. The method of claim 1, wherein the parent knowledge message is received from a central unit of a IAB donor.

8. The method of claim 7, wherein the parent knowledge message is carried by a F1-AP message.

9. The method of claim 7, wherein the parent knowledge message is carried by a radio resource control (RRC) message.

10. The method of claim 1, further comprising providing a number of guard symbols at the transition time, the number of guard symbols being based on the determined number of guard symbols provided by the parent IAB node.

11. An apparatus for wireless communication at a child integrated access and backhaul (IAB) node, comprising:
a memory; and
at least one processor coupled to the memory and configured to:
receive a parent knowledge message, the parent knowledge message indicating whether a parent IAB node of the child IAB node has received an optional signaling message;
perform a transition between first resources and second resources at a transition time, the first resources being associated with use of a mobile termination of the child IAB node, the second resources being associated with use of a distributed unit of the child IAB node; and
wherein a number of guard symbols provided by the parent IAB node at the transition time is based on whether the parent knowledge message indicates that the parent IAB node has received the optional signaling message.

12. The apparatus of claim 11, wherein the parent knowledge message identifies a selected rule for determination of potential transition instances from a pre-defined list of rules based on the optional signaling message.

13. The apparatus of claim 11, wherein the optional signaling message identifies a resource configuration of the child IAB node to the parent IAB node or identifies an allocation of cell specific signal of the child IAB node to the parent IAB node.

14. The apparatus of claim 11, wherein the parent knowledge message is received from the parent IAB node.

15. The apparatus of claim 14, wherein the parent knowledge message is carried by a media access control control element (MAC-CE).

16. The apparatus of claim 15, wherein the MAC-CE indicates guard symbols provided by the parent node.

17. The apparatus of claim 11, wherein the parent knowledge message is received from a central unit of a IAB donor.

18. The apparatus of claim 17, wherein the parent knowledge message is carried by a F1-AP message.

19. The apparatus of claim 17, wherein the parent knowledge message is carried by a radio resource control (RRC) message.

20. The apparatus of claim 11, wherein the at least one processor is further configured to provide a number of guard symbols at the transition time, the number of guard symbols being based on the determined number of guard symbols provided by the parent IAB node.

21. An apparatus for wireless communication at a parent integrated access and backhaul (IAB) node, comprising:
a memory; and
at least one processor coupled to the memory and configured to:
receive an optional signaling message from a central unit of an IAB donor;
transmit, to a child IAB node, a parent knowledge message indicating that the parent IAB node has received the optional signaling message; and
provide a number of guard symbols at a transition time of the child IAB node, the number of guard symbols being based on the optional signaling message.

22. The apparatus of claim 21, wherein the optional signaling message identifies a resource configuration of the child IAB node to the parent IAB node or identifies an allocation of cell specific signal of the child IAB node to the parent IAB node.

23. The apparatus of claim 21, wherein the parent knowledge message is carried by a media access control control element (MAC-CE).

24. The apparatus of claim 23, wherein the MAC-CE indicates guard symbols provided by the parent node.

25. The apparatus of claim 21, wherein the parent knowledge message identifies a selected rule for determination of potential transition instances from a pre-defined list of rules based on the optional signaling message.

26. A method of wireless communication at a parent integrated access and backhaul (IAB) node, comprising:
receiving an optional signaling message from a central unit of an IAB donor;
transmitting, to a child IAB node, a parent knowledge message indicating that the parent IAB node has received the optional signaling message; and
providing a number of guard symbols at a transition time of the child IAB node, the number of guard symbols being based on the optional signaling message.

27. The method of claim 26, wherein the optional signaling message identifies a resource configuration of the child IAB node to the parent IAB node or identifies an allocation of cell specific signal of the child IAB node to the parent IAB node.

28. The method of claim 26, wherein the parent knowledge message is carried by a media access control control element (MAC-CE).

29. The method of claim 28, wherein the MAC-CE indicates guard symbols provided by the parent node.

* * * * *